(12) United States Patent
Luo et al.

(10) Patent No.: US 12,381,966 B2
(45) Date of Patent: Aug. 5, 2025

(54) FOLDABLE ELECTRONIC DEVICE

(71) Applicant: Huawei Technologies Co., Ltd., Shenzhen (CN)

(72) Inventors: Honglei Luo, Shanghai (CN); Yuan Liu, Dongguan (CN); Zengchun Wang, Shanghai (CN); Tongzheng Yu, Shanghai (CN); Ao Fu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 17/909,560

(22) PCT Filed: Mar. 1, 2021

(86) PCT No.: PCT/CN2021/078439
§ 371 (c)(1),
(2) Date: Sep. 6, 2022

(87) PCT Pub. No.: WO2021/175184
PCT Pub. Date: Sep. 10, 2021

(65) Prior Publication Data
US 2023/0145073 A1    May 11, 2023

(30) Foreign Application Priority Data
Mar. 4, 2020   (CN) .......................... 202010142492.3

(51) Int. Cl.
*G09G 5/00* (2006.01)
*H04M 1/02* (2006.01)

(52) U.S. Cl.
CPC ....... *H04M 1/0247* (2013.01); *H04M 1/0214* (2013.01); *H04M 1/0268* (2013.01)

(58) Field of Classification Search
CPC ............ H04M 1/0247; H04M 1/0214; H04M 1/0268; H01Q 1/243; H01Q 1/36; H01Q 1/22; G06F 1/1652
USPC ......................................................... 345/156
See application file for complete search history.

(56) References Cited

U.S. PATENT DOCUMENTS

| | | | |
|---|---|---|---|
| 2015/0227224 A1* | 8/2015 | Park ...................... | G06F 3/0488 345/173 |
| 2016/0085319 A1* | 3/2016 | Kim ................... | H04M 1/0268 345/156 |
| 2016/0184700 A1* | 6/2016 | Lee ....................... | G06F 3/1423 463/31 |
| 2017/0018258 A1 | 1/2017 | Yeung | |
| 2018/0242446 A1 | 8/2018 | Cho et al. | |
| 2019/0018454 A1* | 1/2019 | Jung ..................... | G06F 1/1652 |

(Continued)

FOREIGN PATENT DOCUMENTS

| | | |
|---|---|---|
| CN | 201937641 U | 8/2011 |
| CN | 203014919 U | 6/2013 |

(Continued)

*Primary Examiner* — Jennifer T Nguyen
(74) *Attorney, Agent, or Firm* — Conley Rose, P.C.

(57) ABSTRACT

A foldable electronic device that includes a first display area, a second display area, a third display area, and a fourth display area, when the foldable electronic device is bent inwards to be in a folded state, shortcut information is displayed and interaction is performed using the fourth display area and the third display area to enable a user to view information and perform the interaction without unfolding the foldable electronic device.

20 Claims, 24 Drawing Sheets

(56) References Cited

U.S. PATENT DOCUMENTS

| | | | |
|---|---|---|---|
| 2020/0012324 A1 | 1/2020 | Sung et al. | |
| 2020/0098291 A1* | 3/2020 | Wu | H10K 59/12 |
| 2020/0364021 A1* | 11/2020 | Park | H04N 23/51 |
| 2022/0286541 A1* | 9/2022 | Lee | G06F 1/1681 |

FOREIGN PATENT DOCUMENTS

| | | |
|---|---|---|
| CN | 105786108 A | 7/2016 |
| CN | 106790820 A | 5/2017 |
| CN | 107508932 A | 12/2017 |
| CN | 107608452 A | 1/2018 |
| CN | 108108062 A | 6/2018 |
| CN | 108508967 A | 9/2018 |
| CN | 207968583 U | 10/2018 |
| CN | 108900673 A | 11/2018 |
| CN | 208445604 U | 1/2019 |
| CN | 109618033 A | 4/2019 |
| CN | 109639864 A | 4/2019 |
| CN | 109905507 A | 6/2019 |
| CN | 208940014 U | 6/2019 |
| CN | 109995917 A | 7/2019 |
| CN | 209105238 U | 7/2019 |
| CN | 110401768 A | 11/2019 |
| CN | 209982528 U | 1/2020 |
| CN | 211791607 U | 10/2020 |
| WO | 2017114464 A1 | 7/2017 |

* cited by examiner

007# FOLDABLE ELECTRONIC DEVICE

CROSS-REFERENCE TO RELATED APPLICATIONS

This is a U.S. National Stage of International Patent Application No. PCT/CN2021/078439 filed on Mar. 1, 2021, which claims priority to Chinese Patent Application No. 202010142492.3 filed on Mar. 4, 2020. Both of the aforementioned applications are hereby incorporated by reference in their entireties.

TECHNICAL FIELD

This application relates to the field of terminal technologies, and in particular, to a foldable electronic device.

BACKGROUND

As mobile devices such as mobile phones constantly develop, users have an increasingly strong demand for large-screen mobile phones. However, the large-screen mobile phones obviously are inconvenient to carry. Therefore, a foldable screen mobile phone with a screen that can be extended and deformed becomes main trends for improving carrying convenience. To meet differentiated requirements of different users, various foldable mobile phones with an inward folding screen or an outward folding screen emerge.

Currently, after the foldable mobile phone with an inward folding screen is folded, two display areas face each other. In an unfolding process, one end of each of the two display areas rotates around the other end to open. However, during use, if a user needs to view shortcut information, for example, time and a battery level, the user needs to unfold the foldable mobile phone to view the shortcut information. This is inconvenient for the user to view the shortcut information and affects user experience, and a service life of the foldable mobile phone is affected dues to multiple times of folding.

SUMMARY

This application provides a foldable electronic device, to help a user conveniently view information, reduce a quantity of folding times, and resolve a problem that it is inconvenient to view information on an existing foldable mobile phone with an inward folding screen and that a service life is affected due to multiple times of folding.

This application provides a foldable electronic device including a foldable display screen. The foldable display screen includes a first display area, a second display area, a third display area, and a fourth display area.

The fourth display area is located between the second display area and the third display area, and the second display area faces away from the third display area.

When the foldable electronic device is in a folded state, the first display area faces the second display area.

The rear side of the second display area includes a first area and a second area.

The foldable electronic device further includes at least one camera, and the at least one camera is disposed in the first area.

The third display area is fixedly disposed in the second area.

A button is further disposed in the fourth display area.

In the foldable electronic device provided in this embodiment of this application, the fourth display area is located between the second display area and the third display area, the second display area faces away from the third display area. When the foldable electronic device is in a folded state, the first display area faces the second display area. In this way, when the foldable electronic device is in a folded state, shortcut information may be displayed and interaction may be performed by using the fourth display area and the third display area, so that a user does not need to view information and perform interaction after unfolding the foldable electronic device, and a quantity of folding times of the foldable device are reduced. Therefore, the foldable electronic device provided in this embodiment of this application enables the user to conveniently view information when the foldable electronic device is in a folded state, increases a service life of the foldable electronic device, ensures that an interaction operation can be implemented when the foldable electronic device is in a folded state, and more items can be operated by the user when the mobile phone is in a folded state. This can resolve a problem that shortcut information cannot be conveniently viewed on an existing foldable mobile phone in a folded state and a service life of the foldable mobile phone is affected due to excessive folding times for viewing shortcut information.

In a possible implementation, the fourth display area is located on a first side edge of the foldable electronic device. In this way, the first side edge of the foldable electronic device may perform displaying by using the fourth display area, to allow more areas to perform displaying when the foldable electronic device is in a folded state.

In a possible implementation, the foldable display screen further includes a fifth display area, and the fifth display area is located between the first display area and the second display area.

In a possible implementation, the button is a virtual button.

In a possible implementation, the virtual button is configured as a volume button.

In a possible implementation, an indicator is disposed in the fourth display area.

In a possible implementation, the virtual button includes at least one of the following:

a dial button, a camera button, or a payment button.

In a possible implementation, the fourth display area displays first indication information, and the first indication information indicates a battery level of the electronic device.

In a possible implementation, the foldable electronic device further includes a distance sensor and/or an ambient optical sensor, and the distance sensor and/or the ambient optical sensor are/is disposed in the first area.

In a possible implementation, the foldable electronic device further includes a first structural part, a second structural part, and a first hinge. The first structural part supports the first display area of the foldable display screen.

The second structural part supports the second display area of the foldable display screen.

The first structural part and the second structural part rotate relative to the first hinge, so that when the foldable electronic device is in a folded state, the first display area faces the second display area.

In a possible implementation, the fifth display area is located at the first hinge.

In a possible implementation, the foldable display screen further includes a sixth display area and a seventh display area.

The seventh display area is located between the sixth display area and the first display area.

The sixth display area is fixedly disposed on the rear side of the first display area, or when the foldable electronic device is in a folded state, the sixth display area faces away from the first display area. In this way, when the foldable electronic device is in a folded state, the sixth display area, the seventh display area, the third display area, and the fourth display area all can display shortcut information, so that a user can view shortcut information more conveniently.

In a possible implementation, the seventh display area is located on a second side edge of the foldable electronic device. When the foldable electronic device is in an unfolded state, the first side edge faces the second side edge.

In a possible implementation, the foldable electronic device further includes a third structural part and a second hinge. The third structural part is rotationally connected to the first structural part by using the second hinge.

The seventh display area is located on the second hinge.

The third structural part supports the sixth display area.

In a possible implementation, an orthographic projection area that is on the rear side of the first display area and that is of the sixth display area partially or completely covers the rear side of the first display area.

In a possible implementation, the foldable electronic device further includes a rear cover, at least a part of an area of the rear cover is located in the first area, and an outer surface of the rear cover located in the first area is aligned with a display surface of the third display area. In this way, there is no height difference between the third display area and the part that is of the rear cover and that is located in the first area, and the third display area of the foldable electronic device and the part that is of the rear cover and that is located in the first area form a smooth outer surface.

In a possible implementation, an end surface of an end that is of the camera and that faces an object side protrudes from an outer surface of the rear cover located in the first area.

DESCRIPTION OF REFERENCE NUMERALS

Figure 1:
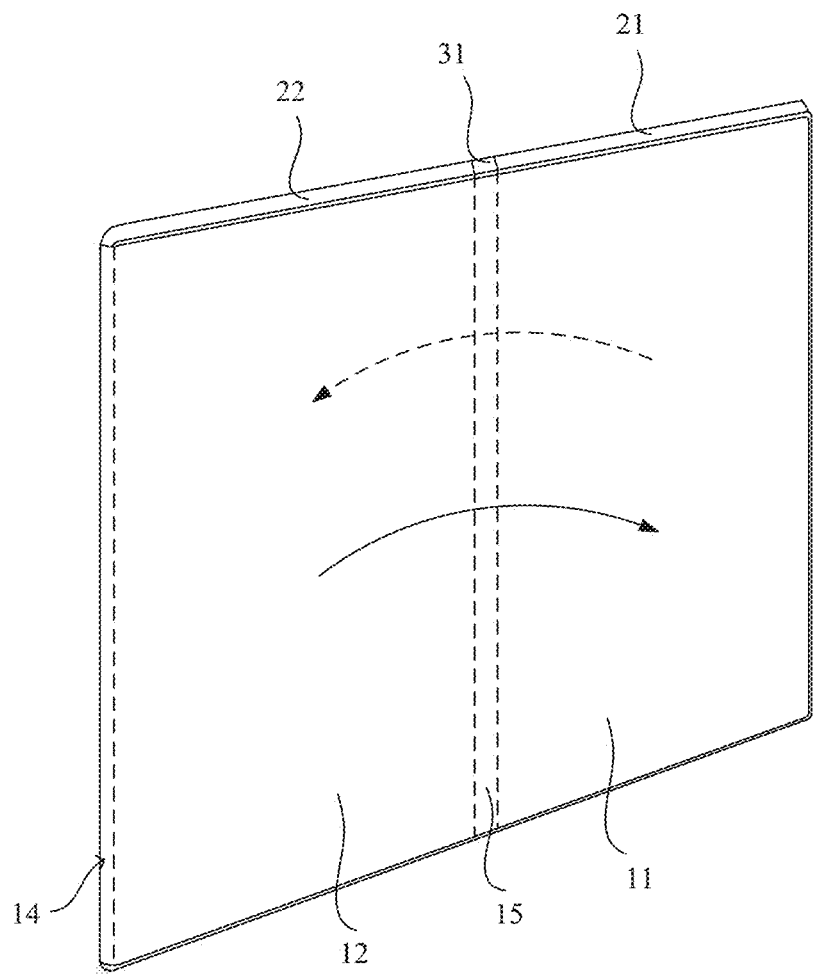
FIG. 1 is a perspective view of a structure of a foldable electronic device in an unfolded state according to an embodiment of this application.

10—Foldable display screen; 11—first display area; 12—second display area; 121—rear side; 121a—first area; 121b—second area; 13—third display area; 14—fourth display area; 15—fifth display area; 16—sixth display area; 17—seventh display area; 21—first structural part; 211—first middle plate; 212— second side edge of the first structural part; 213—first bottom edge; 214—first top edge; 22—second structural part; 221—second middle plate; 222—first side edge of the second structural part; 223—second bottom edge; 224—second top edge; 225—second side edge of the second structural part; 23—third structural part; 31—first hinge; 32—second hinge; 40—rear cover; 41—first rear cover; 42—second rear cover; 43—third rear cover; 51—camera; 52—sensor; 53—mounting plate; 60—circuit board; 71—first battery; 72—second battery; 80—supporting steel sheet.

DESCRIPTION OF EMBODIMENTS

Terms used in implementations of this application are merely used to explain specific embodiments of this application, but are not intended to limit this application. The following describes implementations of embodiments of this application in detail with reference to the accompanying drawings.

A foldable electronic device provided in embodiments of this application may include but is not limited to a mobile phone, a tablet computer, a notebook computer, an ultra-mobile personal computer (ultra-mobile personal computer, UMPC), a handheld computer, a handheld transceiver, a netbook, a POS terminal, a personal digital assistant (personal digital assistant, PDA), a dashboard camera, a security protection device, or another foldable mobile terminal or fixed terminal.

In embodiments of this application, an example in which a mobile phone is the foregoing foldable electronic device is used for description, and the mobile phone is a foldable mobile phone with an inward folding screen and an additional external screen.

In an existing foldable mobile phone with an inward folding screen, when the foldable mobile phone is folded, two display areas face each other. When a user needs to view shortcut information, the user needs to unfold the foldable mobile phone for viewing, which is inconvenient for the user to view the shortcut information. In addition, the foldable mobile phone needs to be unfolded each time of viewing, and consequently a service life of the foldable mobile phone is affected due to multiple times of folding.

In embodiments of this application, a third display area and a fourth display area are added to the foldable display screen. When the foldable mobile phone is in a folded state, the third display area and the fourth display area are exposed to the outside. In this way, the third display area and the fourth display area can display shortcut information, so that a user may view the shortcut information without unfolding the foldable mobile phone. This can reduce a quantity of folding times of the foldable mobile phone, and avoid a problem of inconvenience in viewing and excessive folding times that are caused when the user unfolds the mobile phone to view the short cut information.

A structure of the foldable mobile phone provided in embodiments of this application is described in detail by using the following scenarios.

Scenario 1

Figure 2:
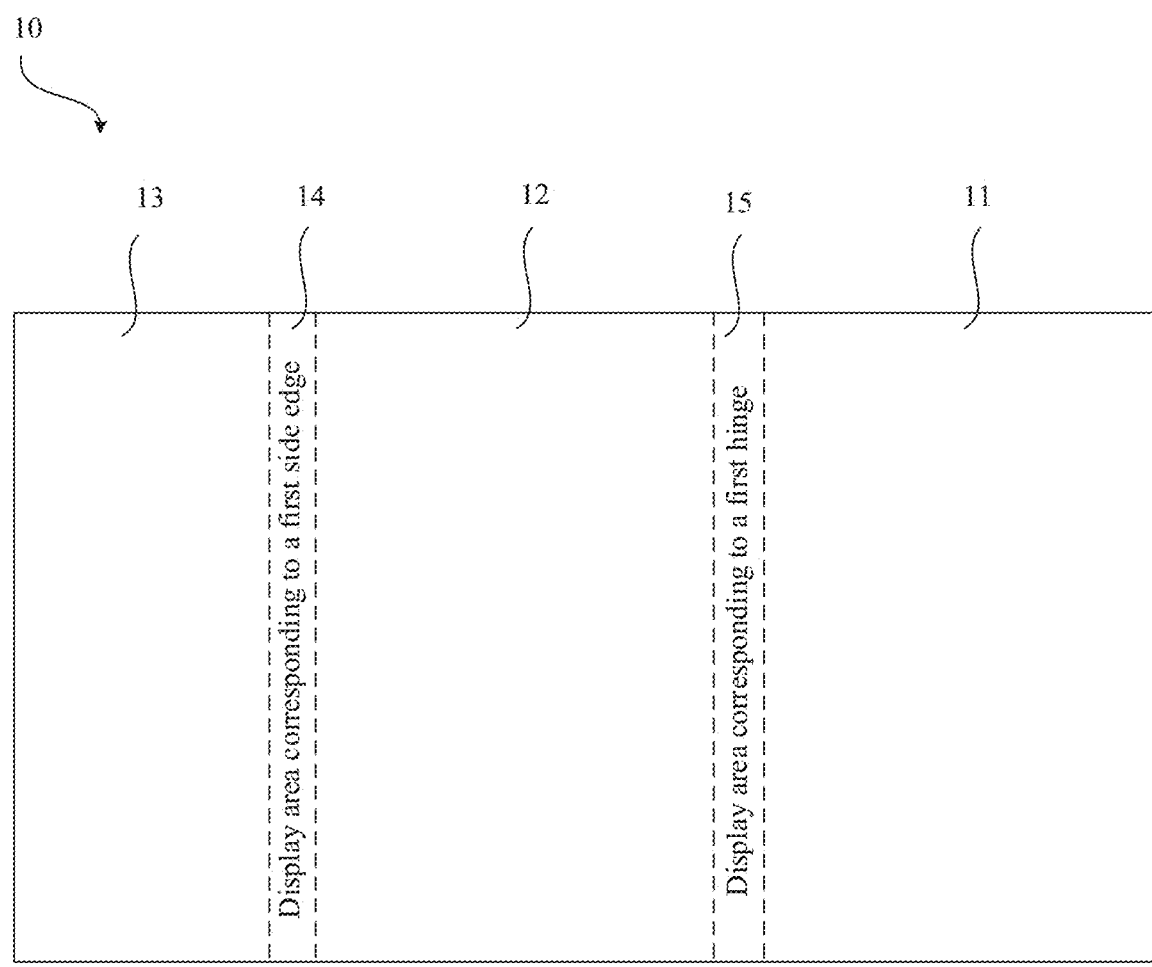
FIG. 2 is a schematic diagram of a structure of an unfolded foldable display screen in a foldable electronic device according to an embodiment of this application.

FIG. 1 shows a structure of a foldable mobile phone in an unfolded state, and FIG. 2 is a schematic plan view of a structure of an unfolded foldable display screen.

As shown in FIG. 1 and FIG. 2, the foldable mobile phone may include a foldable display screen 10. The foldable display screen 10 may be an organic light-emitting diode (Organic Light-Emitting Diode, OLED) display screen, or may be another bendable flexible display screen.

Figure 3:
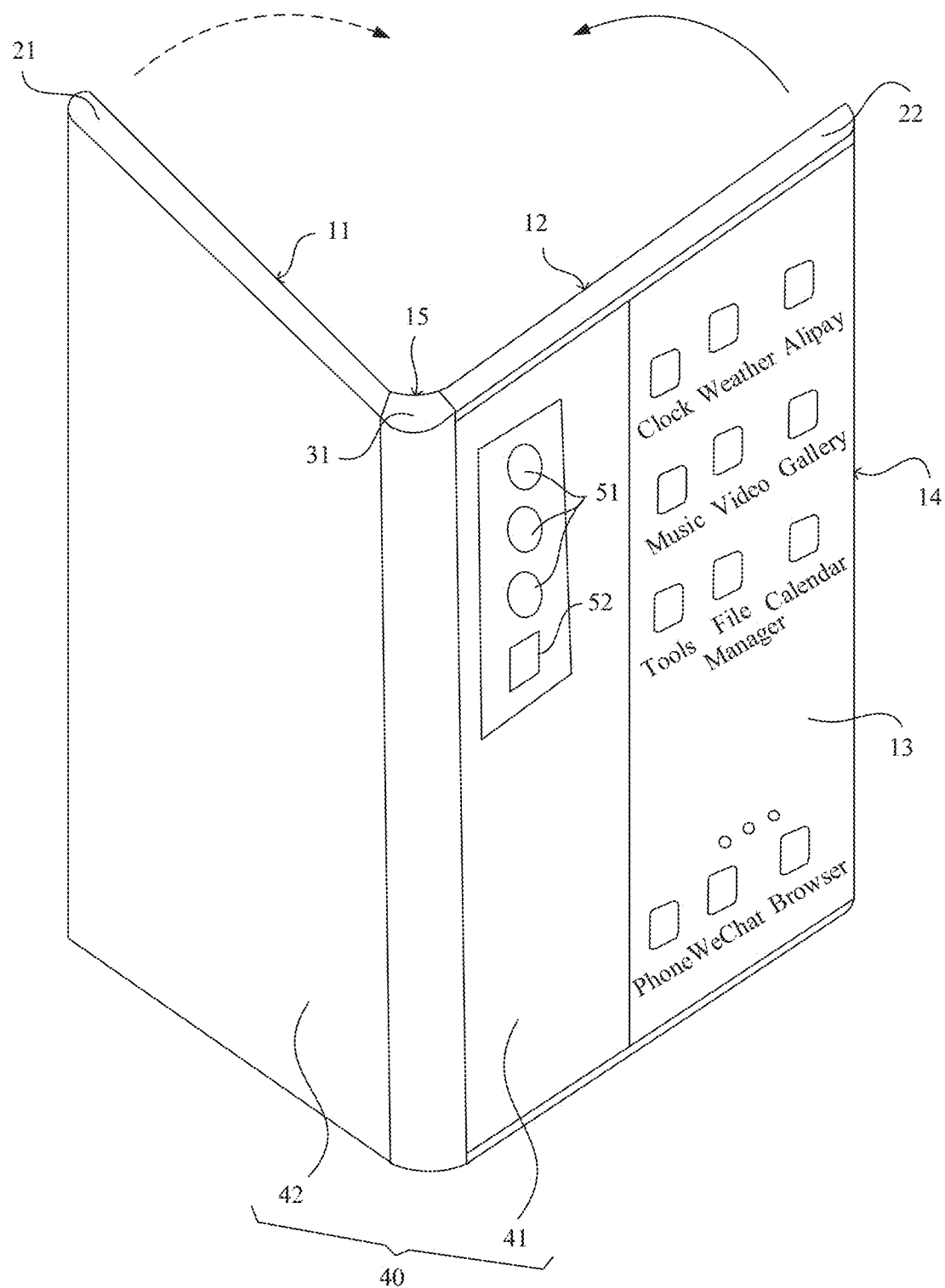
FIG. 3 is a perspective view of a structure of a foldable electronic device folded by a specific angle according to an embodiment of this application.
Figure 4:
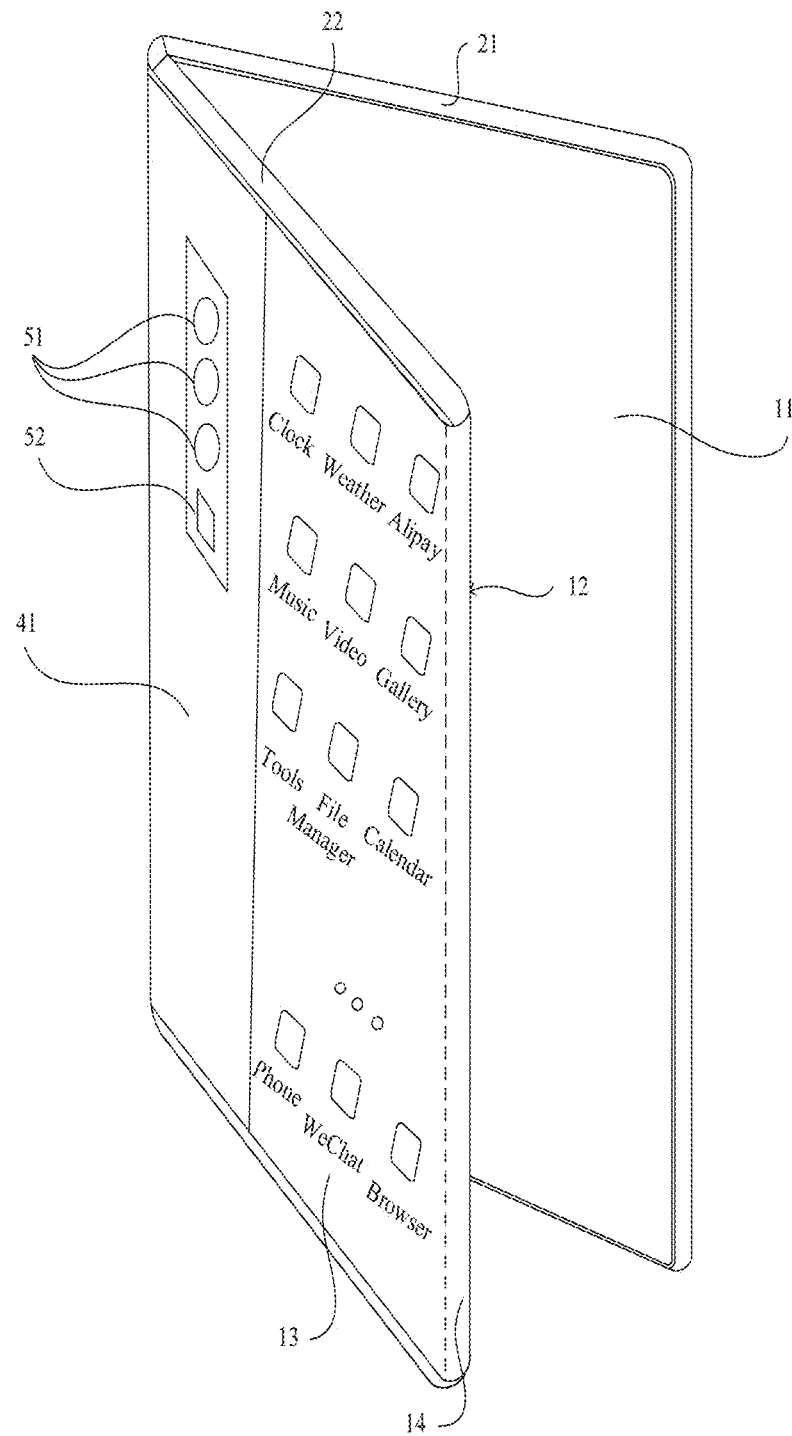
FIG. 4 is a perspective view of a structure of a foldable electronic device in another direction when the foldable electronic device is folded according to an embodiment of this application.

As shown in FIG. 2, the foldable display screen 10 may include a first display area 11, a second display area 12, a third display area 13, and a fourth display area 14. The fourth display area 14 is located between the second display area 12 and the third display area 13, and the second display area 12 and the third display area 13 face away from each other. For example, as shown in FIG. 1, when the foldable mobile phone is in an unfolded state, the second display area 12 and the third display area 13 face away from each other. As shown in FIG. 3 and FIG. 4, when the foldable mobile phone is folded and the first display area 11 and the second display area 12 are at a specific angle (for example, the first display area 11 and the second display area 12 are at 30°, the second display area 12 and the third display area 13 still face away from each other. Therefore, in this embodiment of this application, when the foldable mobile phone is in an unfolded state or a folded state, a relative position of the third display area 13 to the second display area 12 is fixed, and the third display area 13 may be fixedly disposed on a rear side of the second display area 12 and located in a second area 121*b* on the rear side of the second display area 12 (refer to FIG. 6 below). The third display area 13 and the second display area 12 may be fixedly disposed and cannot rotate relative to each other.

In a possible implementation, as shown in FIG. 1 and FIG. 2, the foldable display screen may further include a fifth display area 15, and the fifth display area 15 is located between the first display area 11 and the second display area 12. A center axis of the fifth display area 15 coincides with a center axis of the foldable electronic device. As shown in FIG. 1, when the foldable mobile phone is in an unfolded state, the fifth display area 15 is in a same plane with the first display area 11 and the second display area 12. When the foldable mobile phone is folded, the first display area 11 and the second display area 12 may be folded around the center axis of the fifth display area 15.

It should be noted that, the second display area 12 facing away from the third display area 13 means that a display surface of the second display area 12 faces away from a display surface of the third display area 13. For example, the display surface of the second display area 12 faces away from the display surface of the third display area 13.

Figure 5:
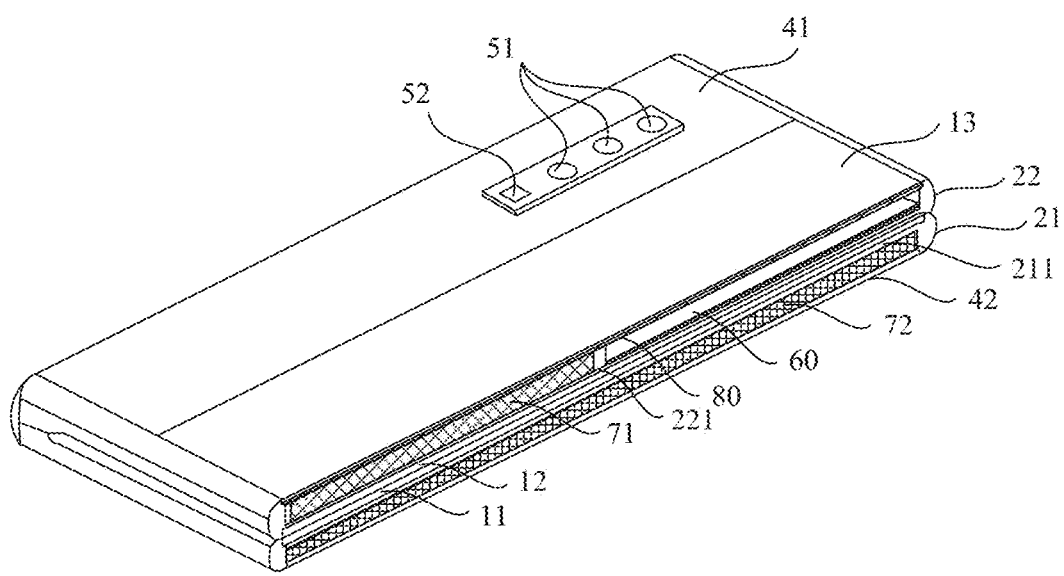
FIG. 5 is a cross-sectional view of a structure of a foldable electronic device in a folded state according to an embodiment of this application.

In this embodiment of this application, as shown in FIG. 5, when the foldable electronic device is in a folded state, the first display area 11 faces the second display area 12. For example, a display surface of the first display area 11 faces a display surface of the second display area 12. In other words, the display surface of the first display area 11 faces the display surface of the second display area 12. In this way, when the foldable electronic device is in a folded state, the first display area 11 faces the second display area 12, the third display area 13 and the fourth display area 14 are exposed to the outside (refer to FIG. 4), and the third display area 13 and the fourth display area 14 may display shortcut information, so that a user can still view the shortcut information when the mobile phone is not unfolded. This can reduce a quantity of folding times of the foldable electronic device.

In this embodiment of this application, the foldable electronic device being in an unfolded state may be a state of the foldable electronic device when the first display area 11 and the second display area 12 are at 180° as shown in FIG. 1. The folded state of the foldable electronic device may be a state of the foldable electronic device when the first display area 11 and the second display area 12 are at 0° as shown in FIG. 5. When an angle between the first display area 11 and the second display area 12 in the foldable electronic device is greater than 0 and less than 180°, for example, when the angle between the first display area 11 and the second display area 12 is 90° or 135°, the foldable electronic device may be in a semi-unfolded state or a semi-folded state.

Figure 6:
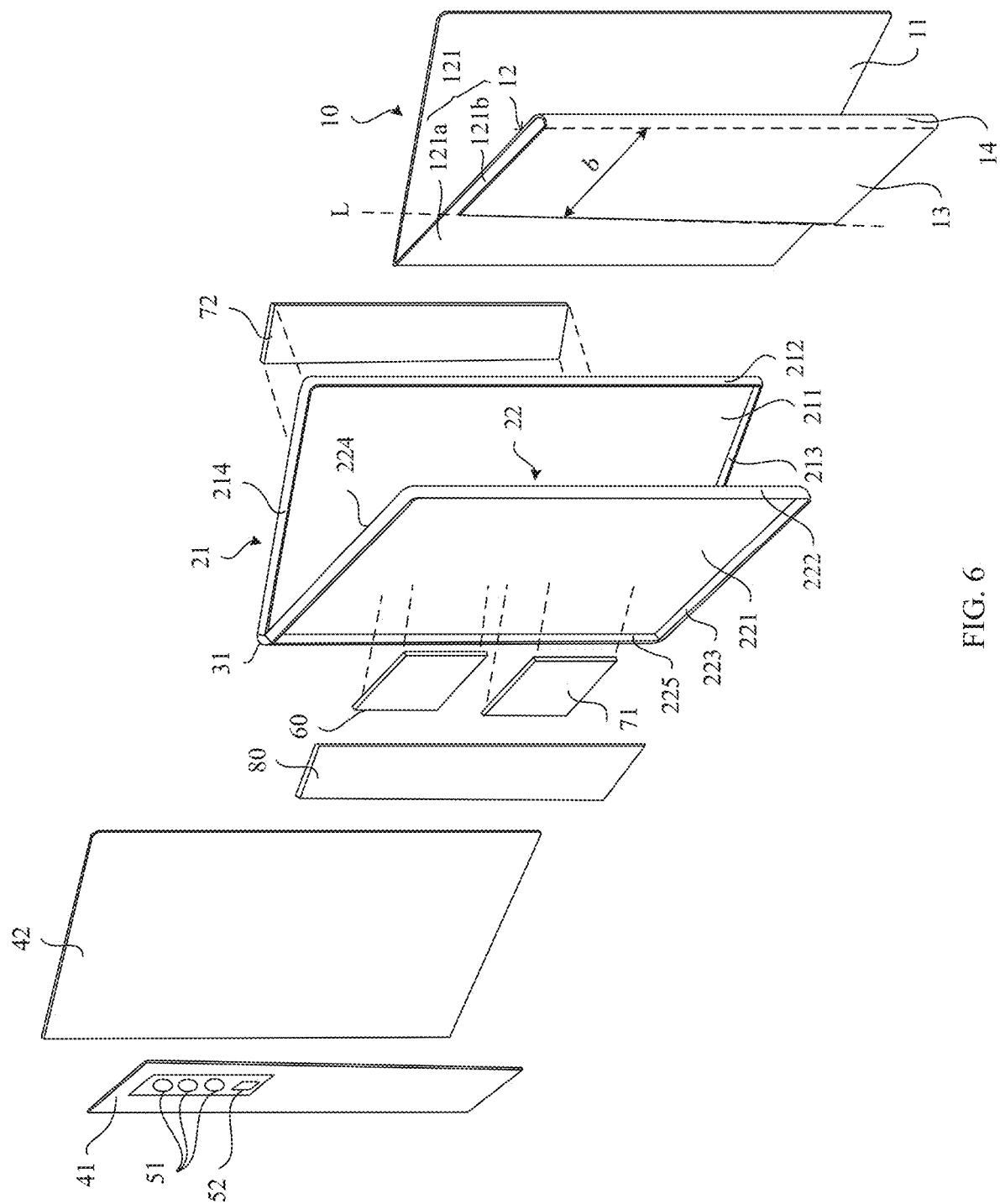
FIG. 6 is an exploded view of a structure of a foldable electronic device according to an embodiment of this application.

In this embodiment of this application, as shown FIG. 6, a rear side 121 of the second display area 12 may include a first area 121a and a second area 121b. For example, the rear side 121 of the second display area 12 is divided into two areas by using a dashed line L in FIG. 6, and one of the two areas is the first area 121a, and the other is the second area 121b. The first area 121a and the second area 121b may be two long-strip-shaped structures arranged in parallel. In this embodiment, heights of the first area 121a and the second area 121b may be the same, and widths of the first area 121a and the second area 121b may be adjusted based on a width b of the third display area 13.

When the third display area 13 faces away from the second display area 12, the third display area 13 may be located in the second area 121b on the rear side of the second display area 12. In other words, in this embodiment of this application, when the third display area 13 is located in the rear side of the second display area 12, the third display area 13 partially covers the rear side of the second display area 12. Certainly in some other examples, the third display area 13 may also completely cover the rear side of the second display area 12. In other words, the third display area 13 may be located in the first area 1121a and the second area 121b. In this way, the third display area 13 may be provided with a hole. The camera 51 may be located at a position of the hole in the third display area 13, and the third display area 13 is used as a hole-punch display.

It should be noted that, in this embodiment of this application, a fourth display area 14 exists between the third display area 13 and the second display area 12, so that when the third display area 13 and the second display area 12 are disposed facing away from each other, the fourth display area 14 allows a specific spacing between the third display area 13 and the second area 121b of the second display area 12. Therefore, the third display area 13 being located in the second area 121b does not indicate that the third display area 13 is disposed on the second area 121b. Instead, when the third display area 13 is disposed on the rear side of the second display area 12, an orthographic projection area that is of the third display area 13 and that is on the rear side of the second display area 12 is located in the second area 121b. For example, the orthographic projection area that is of the third display area 13 and that is on the rear side of the second display area 12 completely covers the second area 121.

In this embodiment of this application, the foldable electronic device further includes at least one camera 51. For example, there are three cameras 51 as shown in FIG. 6. Certainly, in some other examples, at least four cameras may be disposed to implement a four-camera function. In this embodiment of this application, the at least one camera 51 is located in the first area 121a. In this way, as shown in FIG. 5, the camera 51 is located in the first area 121a on the rear side of the second display area 12, and the third display area 13 is located in the second area 121b of the second display area 12. It should be noted that, the camera 51 being located in the first area 121a is specifically that an orthographic projection that is of the camera 51 and that is on the rear side of the second display area 12 is located in the first area 121a, and a lens end of the camera 51 faces away from the display surface of the second display area 12. In this embodiment of this application, the camera 51 may be used as a front-facing camera for taking a selfie when the mobile phone is in a folded state, or the camera 51 may be used as a rear-facing camera for photographing when the mobile phone is unfolded.

In this embodiment of this application, the foldable electronic device further includes at least one sensor 52. The sensor 52 may be a distance sensor configured to detect a distance during photographing. Alternatively, the sensor 52 may be an ambient optical sensor configured to detect ambient light, to increase or decrease an exposure value during photographing. FIG. 6 shows one sensor 52. In another example, a quantity of the sensors 52 includes but is not limited to one, or may be two. For example, the foldable electronic device includes a distance sensor and an ambient optical sensor. The at least one sensor may be located in the first area 121a and disposed close to the camera 51.

In this embodiment of this application, to support the foldable display screen 10, as shown in FIG. 6, the foldable electronic device may further include a first structural part 21, a second structural part 22, and a first hinge 31. The first structural part 21 and the second structural part 22 rotate relative to the first hinge 31. For example, one end of the first structural part 21 is rotationally connected to one end of the second structural part 22 by using the first hinge 31, and the other end of the first structural part 21 and the other end of the second structural part 22 may rotate around the first hinge 31. The first structural part 21 may support the first display area 11 of the foldable display screen, the second structural part 22 may support the second display area 12 of the foldable display screen, and the first hinge 31 may support the fifth display area 15 of the foldable display screen (refer to FIG. 1). In this way, when the foldable electronic device is in a folded state, the first display area 11 faces the second display area 12, and the fifth display area 15 bends at the first hinge 31.

In this embodiment of this application, the second display area 12 is located on one side of the second structural part 22, and the third display area 13 is located on the other side of the second structural part 22. For example, an inner side of the second structural part 22 is configured to support the second display area 12, an outer side of the second structural part 22 is configured to support the third display area 13, and a side edge of the second structural part 22 is configured to support the fourth display area 14.

Refer to FIG. 6. The first structural part 21 may include a first middle plate 211 and a frame disposed around an outer edge of the first middle plate 211. The frame may include a second side edge 212, a first top edge 214, a first bottom edge 213, and a first side edge (not shown). The second structural part 22 may include a second middle plate 221 and a frame disposed around an outer edge of the second middle plate 221. The frame may include a first side edge 222, a second top edge 224, a second bottom edge 223, and a second side edge 225. The first hinge 31 may be separately connected to the second side edge 225 of the second structural part 22 and the first side edge of the first structural part 21.

In this embodiment of this application, each frame is fastened to the first middle plate 211 and the second middle plate 221 through injection and molding. The first middle plate 211 and the second middle plate 221 may be aluminum plates, aluminum alloys, or magnesium alloys. Each frame may be a metal frame, a glass frame, or a ceramic frame.

In a possible implementation, the first side edge of the foldable electronic device may be the first side edge 222 of the second structural part 22. Refer to FIG. 4 and FIG. 6. The fourth display area 14 may be located on the first side edge 222 of the second structural part 22. In this way, the first side edge 222 of the second structural part 22 is covered by the fourth display area 14, to perform displaying on the first side edge 222 of the second structural part 22, so that no black edge exists on the second side edge 222 of the second structural part 22 in the third display area 13, and a black edge area in the third display area 13 of the foldable electronic device is reduced, thereby ensuring that the foldable electronic device has a larger display area when the foldable electronic device is in a folded state. In this way, when the foldable electronic device is in a folded state, an exposed display area includes but is not limited to displaying shortcut information, and interaction, for example, WeChat chatting or web page browsing, may be further implemented in the display area. In addition, when the fourth display area 14 is located on the first side edge 222, no black edge (refer to FIG. 1) exists on the first side edge 222 in the second display area 12, so that a display area of the second display area 12 is larger. In this way, after the foldable electronic device is unfolded, a screen-to-body ratio of a display screen including the first display area 11 and the second display area 12 is larger.

In a possible implementation, as shown in FIG. 3 and FIG. 6, the foldable mobile phone may further include a rear cover 40. The rear cover 40 may include a first rear cover 41 and a second rear cover 42, and the first rear cover 41 and the second rear cover 42 may be independent rear covers shown in FIG. 6. Certainly, in some other examples, the first rear cover 41 and the second rear cover 42 may be an integrated structure. The second rear cover 42 and the first display area may be respectively located on two sides of the first structural part 21, and the first rear cover 41 and the third display area 13 are located on a same side of the second structural part 22. In this embodiment, the first rear cover 41 may be located in the first area 121a on the rear side of the second display area 12.

As shown in FIG. 6, the at least one camera 51 and the sensor 52 may be located in the first rear cover 41. The first rear cover 41 may be provided with an assembly hole (not shown) for assembling the at least one camera 51 and the sensor 52. An end face of an end that faces an object side and that is of the at least one camera 51 and an end face of an end of the sensor 52 may protrude outwards from the assembly hole, so that the end face of the end that faces the object side and that is of the at least one camera 51 and the end face of the end of the sensor 52 are not in a same plane as an outer surface of the first rear cover 41. Alternatively, an end face of an end that faces an object side and that is of the at least one camera 51 and an end face of an end of the sensor 52 extend into the assembly hole and are aligned with an outer surface of the first rear cover 41. It should be noted that the end face of the end that faces the object side and that is of the camera 51 is specifically an exposed end face of the camera 51 in the first rear cover 41 in FIG. 5, and the end face of the end of the sensor 52 is an exposed end face of the sensor 52 in the first rear cover 41 in FIG. 5.

It should be noted that the camera 51 and the sensor 52 may be separately disposed in the first rear cover 41. Alternatively, as shown in FIG. 5, the camera 51 and the sensor 52 may be assembled on the mounting plate 53 to form an integrated structure, and the integrated structure is mounted in the first rear cover 41. In this embodiment, as shown in FIG. 5, an end face of the mounting plate 53 on the outer surface of the first rear cover 41 is higher than the outer surface of the first rear cover 41. Alternatively, as shown in the following FIG. 7, the mounting plate 53 protrudes on the outer surface of the first rear cover 41. Certainly, an outward-facing end face of the mounting plate 53 may also be aligned with the outer surface of the first rear cover 41.

In this embodiment of this application, the first rear cover 41 and the second rear cover 42 may be metal, glass, plastic, or ceramic rear covers.

In a possible implementation, the first rear cover 41 and the third display area 13 are located on a same side of the second structural part 22, the third display area 13 is located in the second area 121b on the rear side of the second display area 12, and the first rear cover 41 is located in the first area 121a on the rear side of the second display area 12. The outer surface of the first rear cover 41 is aligned with the display surface of the third display area 13. For example, the display surface of the third display area 13 and the outer surface of the first rear cover 41 (that is, a surface facing away from the display surface of the second display area 12) are on a same plane (refer to FIG. 7 below). In this way, when the foldable mobile phone is in a folded state, no mismatch exists between the outer surface of the first rear cover 41 and the display surface of the third display area 13, and smooth transition occurs at a joint between the outer surface of the first rear cover 41 and the third display area 13, so that an appearance of an outer surface formed by the first rear cover 41 and the third display area is smoother, and display effect is not affected. Certainly, in some other examples, the outer surface of the first rear cover 41 is closer to the second display area 12 than to the display surface of the third display area 13. For example, there is a height difference between the outer surface of the first rear cover 41 and the display surface of the third display area 13. The outer surface of the first rear cover 41 may be lower than the display surface of the third display area 13, and the end face of the end that faces the object side and that is of the camera 51 and/or the end face of the end of the sensor 52 may be aligned with the display surface of the third display area 13.

In a possible implementation, as shown in FIG. 6, the foldable mobile phone may further include a circuit board 60, a first battery 71, and a second battery 72. The circuit board 60 and the first battery 71 may be located on a surface that is of the second middle plate 221 of the second structural part 22 and that faces the third display area 13. The second battery 72 may be located on a surface that is of the first middle plate 211 of the first structural part 21 and that faces the second rear cover 42. Certainly, in some other examples, a quantity of the circuit boards 60 may include but is not limited to one. For example, two circuit boards 60 may be included, one circuit board 60 is located on the second middle plate 221 of the second structural part 22 and the other circuit board 60 is located on the first middle plate 211 of the first structural part 21.

In this embodiment, the first battery 71 and the second battery 72 may be connected to the circuit board 60 by using a power supply management module and a charging management module. The power supply management module receives input of the first battery 71, the second battery 72, and/or the charging management module, and supplies power to a processor, an internal memory, an external memory, the foldable display screen 10, a camera module, a communications module, and the like. The power management module may be further configured to monitor parameters such as capacities of the first battery 71 and the second battery 72, cycles of the first battery 71 and the second battery 72, and health statuses (leakage and impedance) of the first battery 71 and the second battery 72. In some other embodiments, the power supply management module may alternatively be disposed in a processor of the circuit board 60. In some other embodiments, the power supply management module and the charging management module may alternatively be disposed in a same component.

In a possible implementation, the foldable mobile phone further includes a supporting steel sheet 80, and the supporting steel sheet 80 is configured to support the foldable display screen 10. FIG. 6 shows one supporting steel sheet 80. The supporting steel sheet 80 is configured to support the third display area 13 of the foldable display screen 10. In some other examples, the first display area 11 and the second display area 12 are disposed to support the foldable display screen 10. As shown in FIG. 5, the supporting steel sheet 80 is located on the circuit board 60 and the first battery 71, the third display area 13 is located on the supporting steel sheet 80, and the circuit board 60 and the first battery 71 are disposed on the surface that is of the second middle plate 221 of the second structural part 22 and that faces the third display area 13. The circuit board 60 and the first battery 71 are disposed in parallel on the second middle plate 221. A part of the second middle plate 221, the circuit board 60, the first battery 71, and the supporting steel sheet 80 may be disposed between the third display area 13 and the second area 121b that is on the rear side of the second display area 12. An orthographic projection that is of the circuit board 60 and that is on the rear side of the second display area 12 may be located in the second area 121b, may be located in the first area 121a, or may be located in the first area 121a and the second area 121b. An orthographic projection that is of the first battery 71 and that is on the rear side of the second display area 12 may be located in the second area 121b, may be located in the first area 121a, or may be located in the first area 121a and the second area 121b. Disposing positions of the first battery 71 and the circuit board 60 are specifically adjusted based on an actual requirement, and this is not limited in this embodiment of this application. Certainly, in some other examples, the first middle plate 211 and the second middle plate 221 may respectively support the first display area 11 and the second display area 12, so that the supporting steel sheet 80 is not disposed on a rear side of the first display area 11 and the rear side of the second display area 12.

Figure 7:
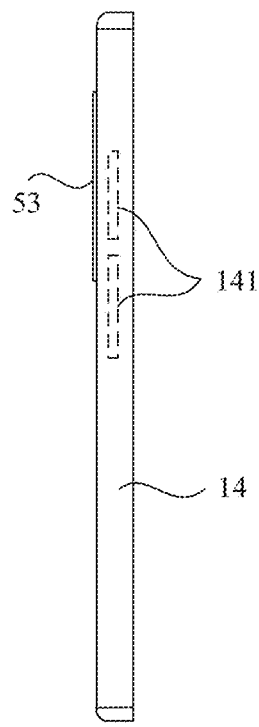
FIG. 7 is a schematic diagram of a fourth display area in a foldable electronic device according to an embodiment of this application.

In this embodiment of this application, as shown in FIG. 7, a button is further disposed in the fourth display area 14. The button may be a virtual button. For example, the button may be a virtual touch button, and the virtual button is displayed in the fourth display area 14. The virtual button shown in FIG. 7 may be configured as a volume button 141. For example, at least one volume button 141 may be displayed in the fourth display area 14. FIG. 7 shows two volume buttons 141, one volume touch button 111 is configured to increase volume, and the other volume touch button 141 is configured to decrease the volume. For example, one of the volume touch buttons 141 may be pressed and held to increase the volume, and the other volume touch button 141 may be pressed and held to decrease the volume. Certainly, in some other examples, one volume button 141 may be disposed. For example, sliding up the volume button 141 is to increase volume, and sliding down the volume button 141 is to decrease the volume.

Figure 8:
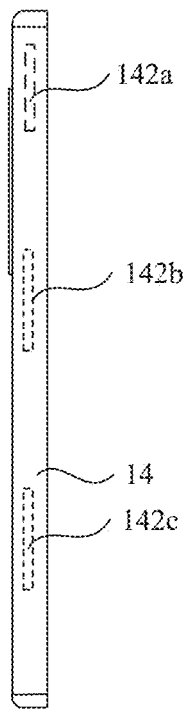
FIG. 8 is another schematic diagram of a fourth display area in a foldable electronic device according to an embodiment of this application.

In another possible implementation, as shown in FIG. 8, at least one virtual shortcut button is disposed in the fourth display area 14, for example, a shortcut button 142a, a shortcut button 142b, and a shortcut button 142c. The plurality of shortcut buttons may include at least one of a dial button, a camera button, or a payment button. Certainly, the shortcut button includes but is not limited to a dial button, a camera button, or a payment button.

Figure 9:
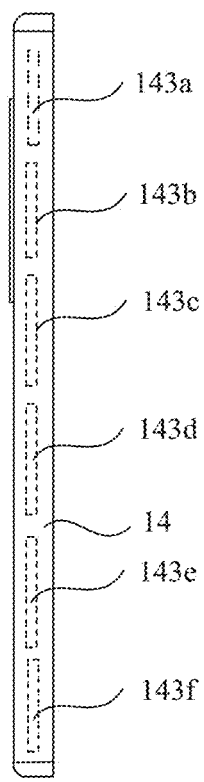
FIG. 9 is still another schematic diagram of a fourth display area in a foldable electronic device according to an embodiment of this application.

In another possible implementation, at least one indicator may be further disposed in the fourth display area 14. As shown in FIG. 9, the fourth display area 14 has multiple display indicators of different colors, for example, a display indicator 143a, a display indicator 143b, a display indicator 143c, a display indicator 143d, a display indicator 143e, and a display indicator 143f. When the display indicators are turned on, ring flashing effect is formed, so that the mobile phone is cooler. The multiple display indicators of different colors may be red, orange, yellow, green, blue, indigo, and purple display indicators, to form a rainbow color. Alternatively, in this embodiment, each display indicator may display multiple colors, and multiple display indicators perform ring-flashing in a rainbow color after being lit.

Figure 10:
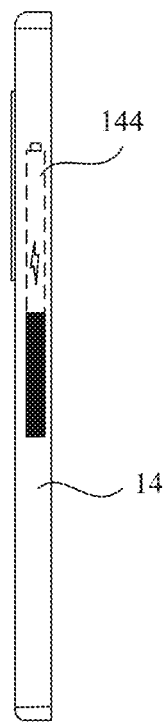
FIG. 10 is yet another schematic diagram of a fourth display area in a foldable electronic device according to an embodiment of this application.

In another possible implementation, the fourth display area 14 displays first indication information, the first indication information indicates a battery level of the electronic device. The first indication information may be a battery level display box 144 shown in FIG. 10. The battery level display box 144 may display the battery level and display a charging status in a charging process. In some other examples, the first indication information may alternatively be a digital identifier. For example, when a battery level is 30%, the first indication information is displayed as 30%. Alternatively, the first indication information may include a battery level display box 144 and a digital identifier. For example, the digital identifier is displayed on the battery level display box 144.

Figure 11:
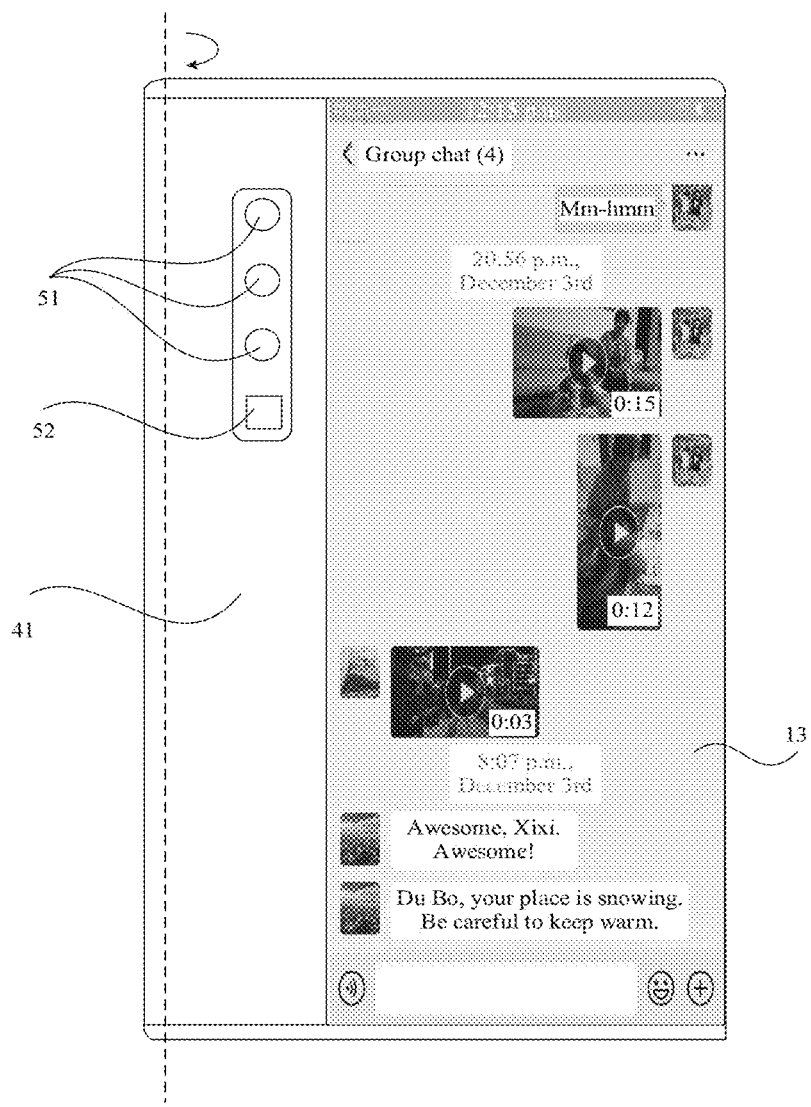
FIG. 11 is a schematic diagram of a display structure of a foldable electronic device in a folded state according to an embodiment of this application.
Figure 12:
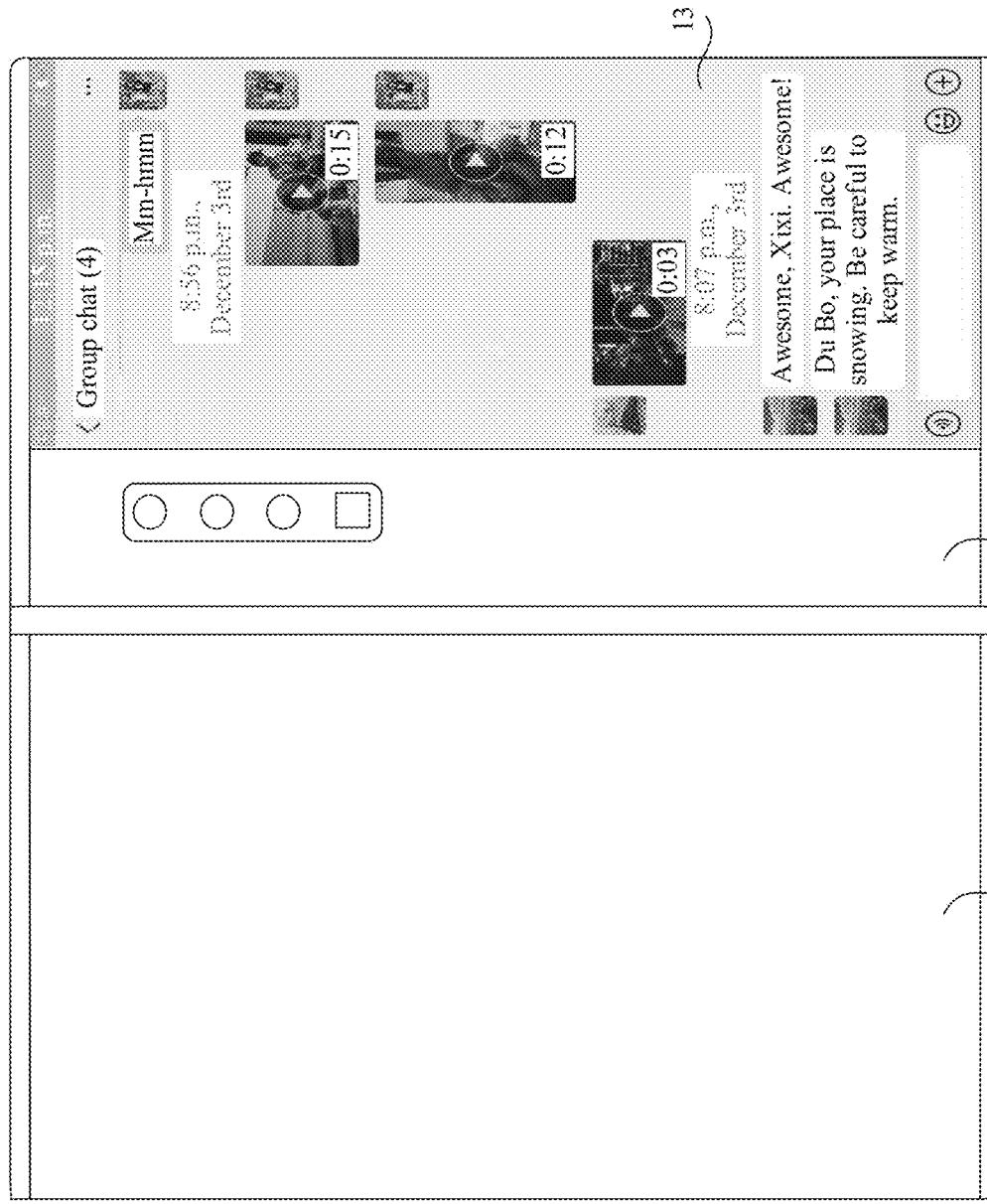
FIG. 12 is a schematic diagram of a structure of a rear side of a foldable electronic device in an unfolded state according to an embodiment of this application.

In this embodiment of this application, when the foldable mobile phone is used, the fourth display area 14 may display a battery level, time, a virtual button, and the like, and the third display area 13 may implement an interaction function. For example, as shown in FIG. 11, when the foldable electronic device is in a folded state, WeChat voice chatting or video chatting may be performed in the third display area 13. Alternatively, as shown in FIG. 12, when the foldable electronic device is in an unfolded state, WeChat chatting may be performed in the third display area 13, in this embodiment, through interaction in the third display area 13 a user can perform interaction only after unfolding the foldable mobile phone.

Figure 13:
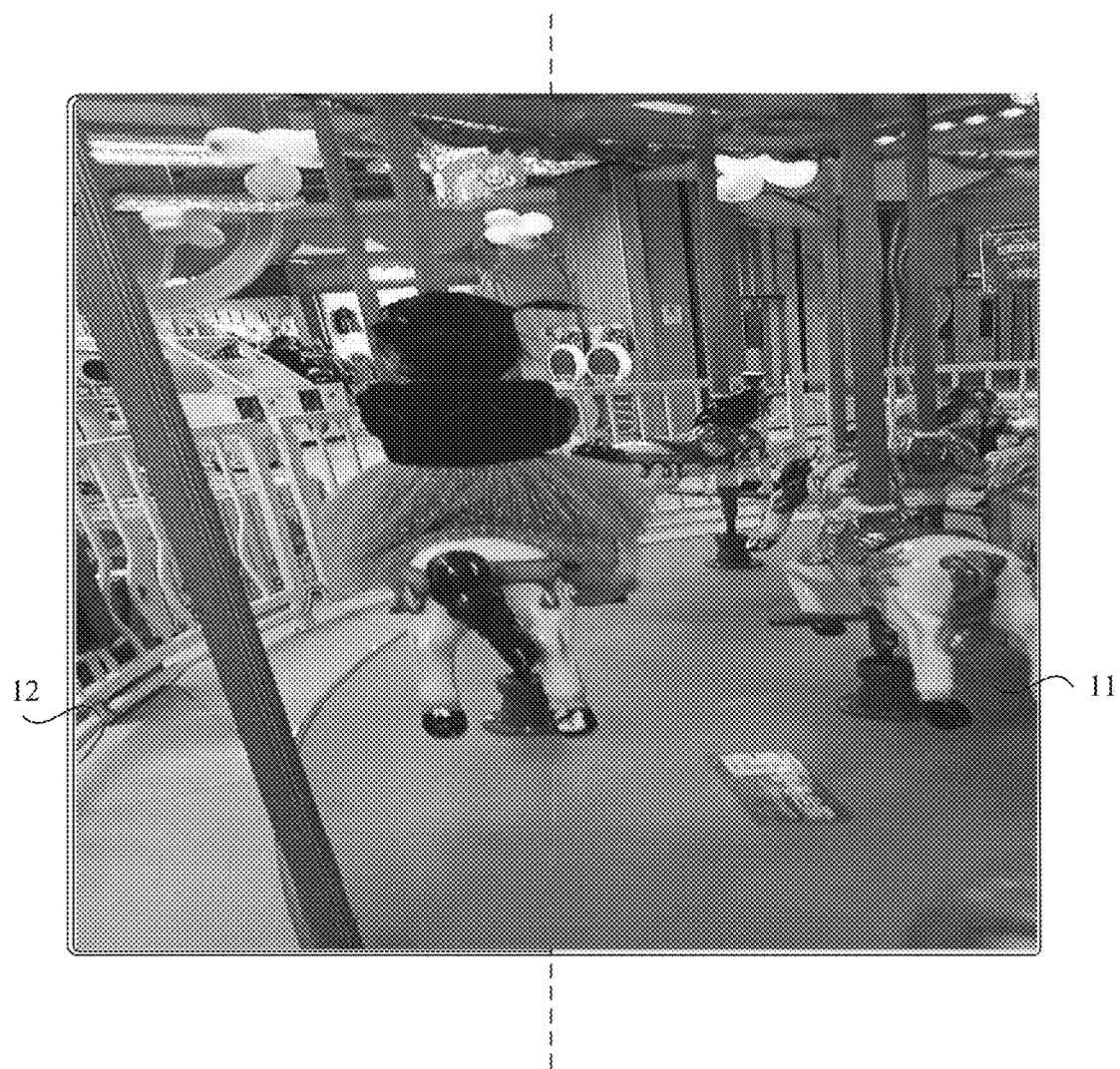
FIG. 13 is a schematic diagram of a first display area and a second display area when a foldable electronic device is in an unfolded state according to an embodiment of this application.
Figure 14:
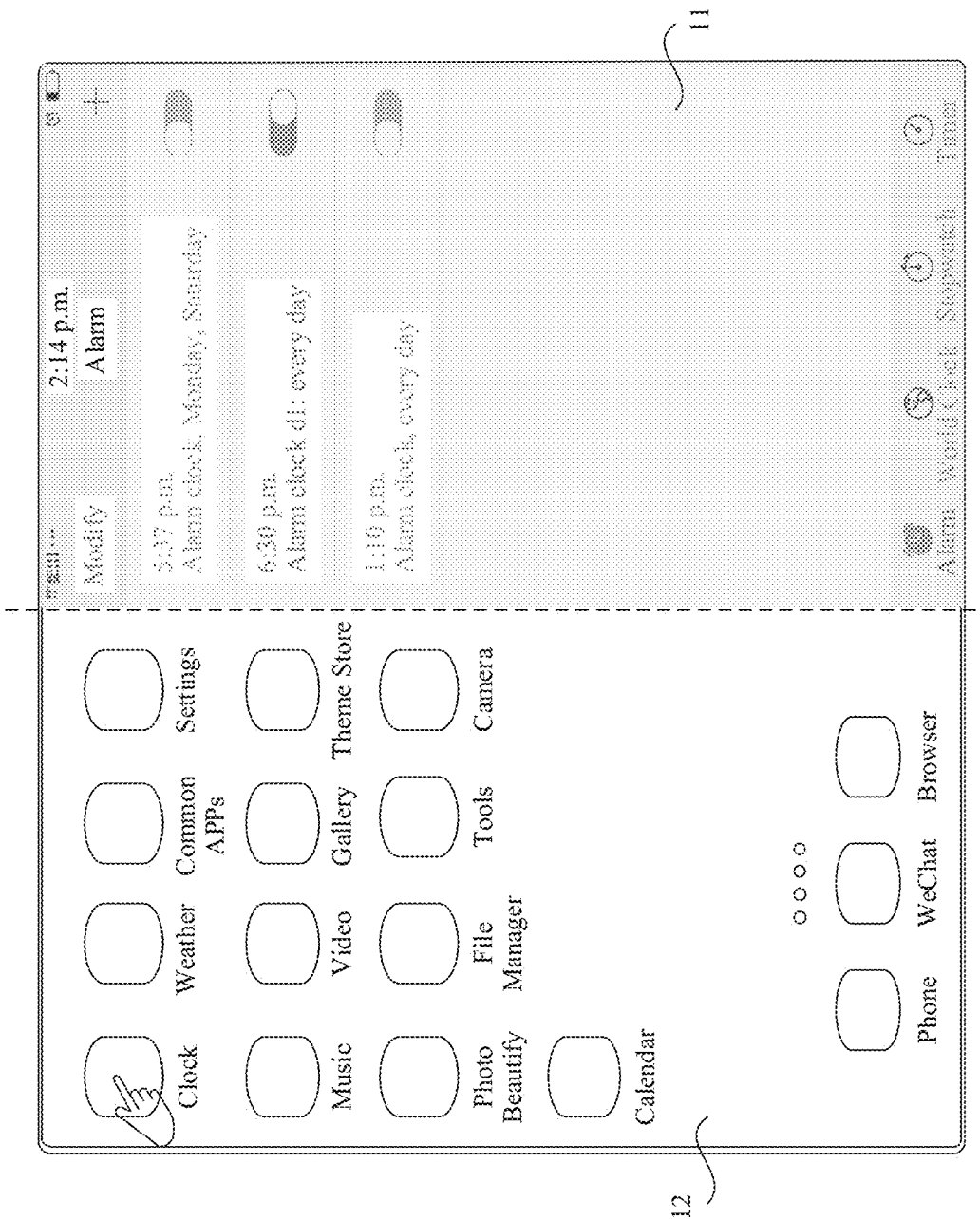
FIG. 14 is another schematic display diagram of a first display area and a second display area when a foldable electronic device is in an unfolded state according to an embodiment of this application.

When the foldable mobile phone is in an unfolded state, as shown in FIG. 13, a photo may be simultaneously displayed in the second display area 12, the first display area 11, and the fifth display area 15. Alternatively, when the foldable mobile phone is in an unfolded state, as shown in FIG. 14, an application icon is displayed in the second display area 12. When a finger of a user touches an icon, for example, a clock icon in FIG. 14, an image after touching is displayed in the first display area 11. The second display area 12 and the first display area 11 may display different content. In this way, for example, the user may chat in the second display area 12 by using WeChat, watch a video in the first display area 11. The user may simultaneously select two different operations.

Figure 15:
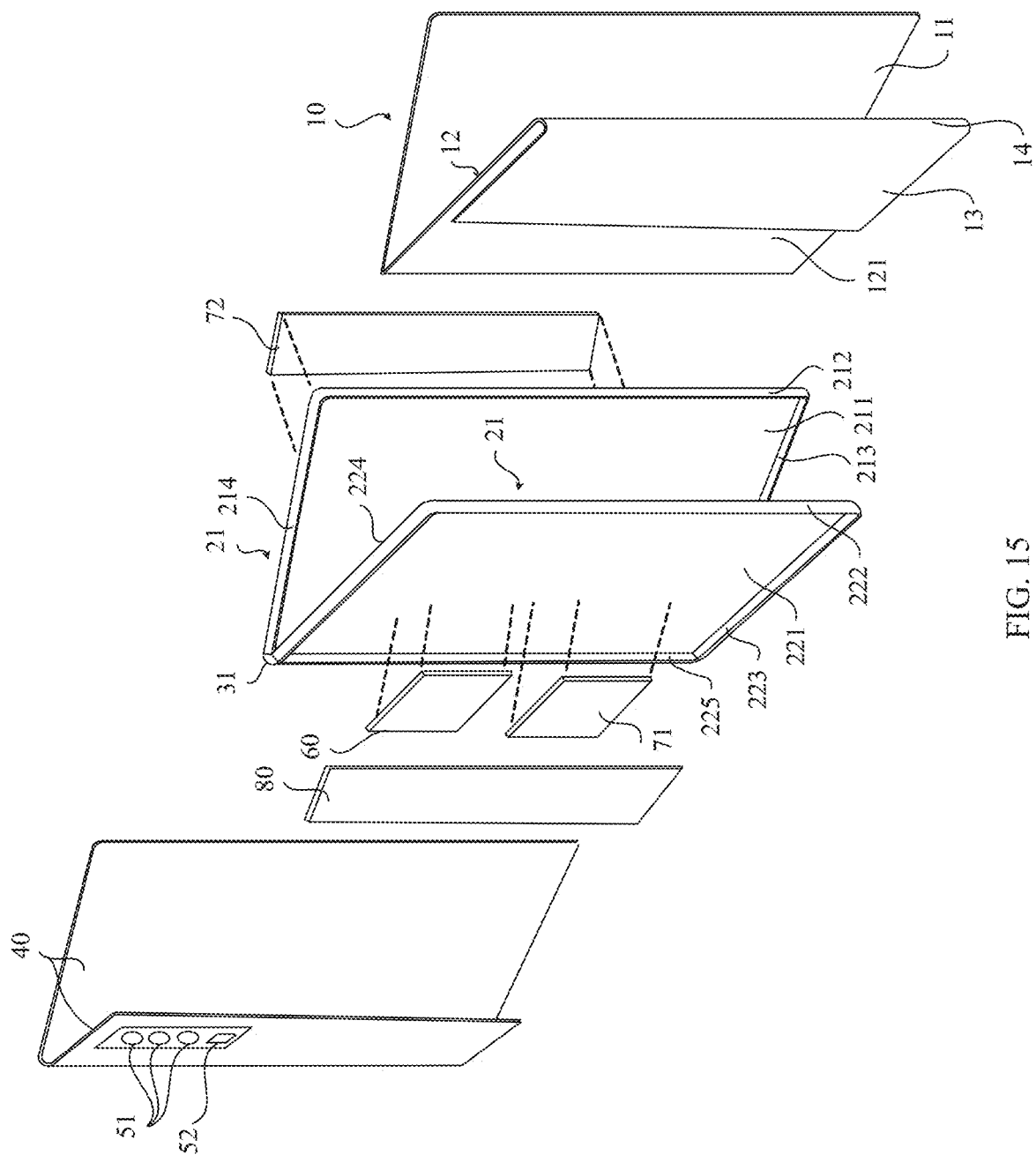
FIG. 15 is an exploded view of a structure of a foldable electronic device according to an embodiment of this application.
Figure 16:
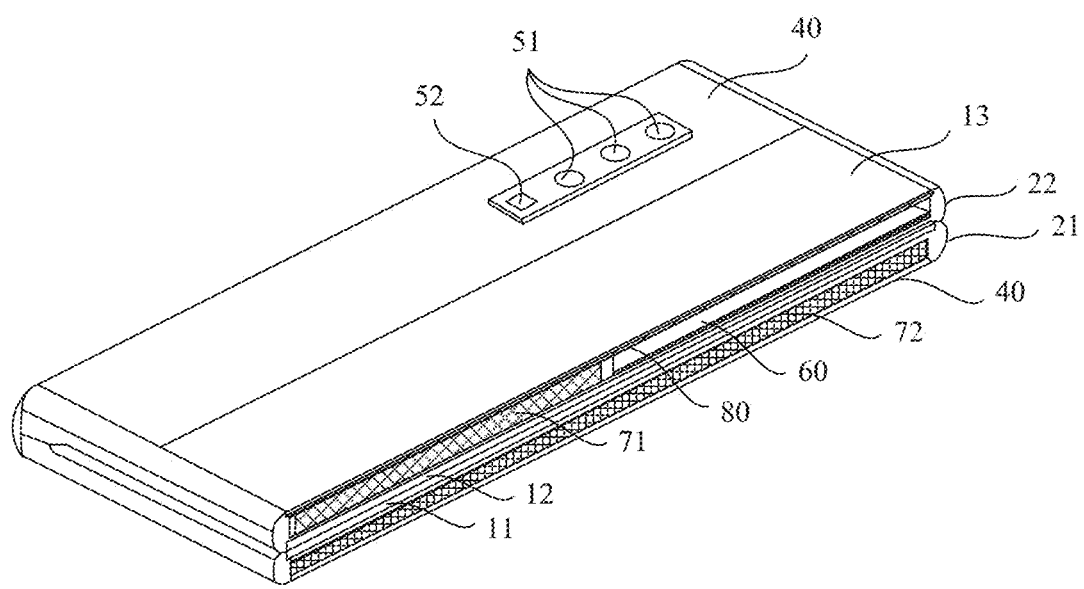
FIG. 16 is a cross-sectional view of a structure of a foldable electronic device in FIG. 15 in a folded state.

In a possible implementation, as shown in FIG. 15, the rear cover 40 may be a bendable rear cover. For example, the rear cover 40 is a flexible cover. In this way, the rear cover 40 may be an integrated plate, and the first rear cover 41 and the second rear cover 41 may be an integrated structure. The rear cover 40 may include three parts. A first part of the rear cover 40 is located in the first area 121a on the rear side of the second display area 12, and is aligned with the display surface of the third display area 13. Alternatively, in another example, an outer surface that is of the rear cover 40 and that is located in the first area 121a is closer to the second display area 12 than to the display surface of the third display area 13. For example, the outer surface that is of the rear cover 40 and that is located in the first area 121*a* is lower than the display surface of the third display area 13. The end face of the end that faces the object side and that is of the camera 51 and/or the end face of the end of the sensor 51 may be aligned with the display surface of the third display area 13. A second part of the rear cover 40 is located at the first hinge 31. The second part of the rear cover 40 and the fifth display area 15 are respectively located on two sides of the first hinge. A third part of the rear cover 40 is located on an outer side of the first structural part 21 and faces away from the first display area 11. When the foldable mobile phone is in a folded state, as shown in FIG. 16, the rear cover 40 bends at the first hinge 31. The first structural part 21 and the second structural part 22 are connected to the rear cover 40.

Figure 17:
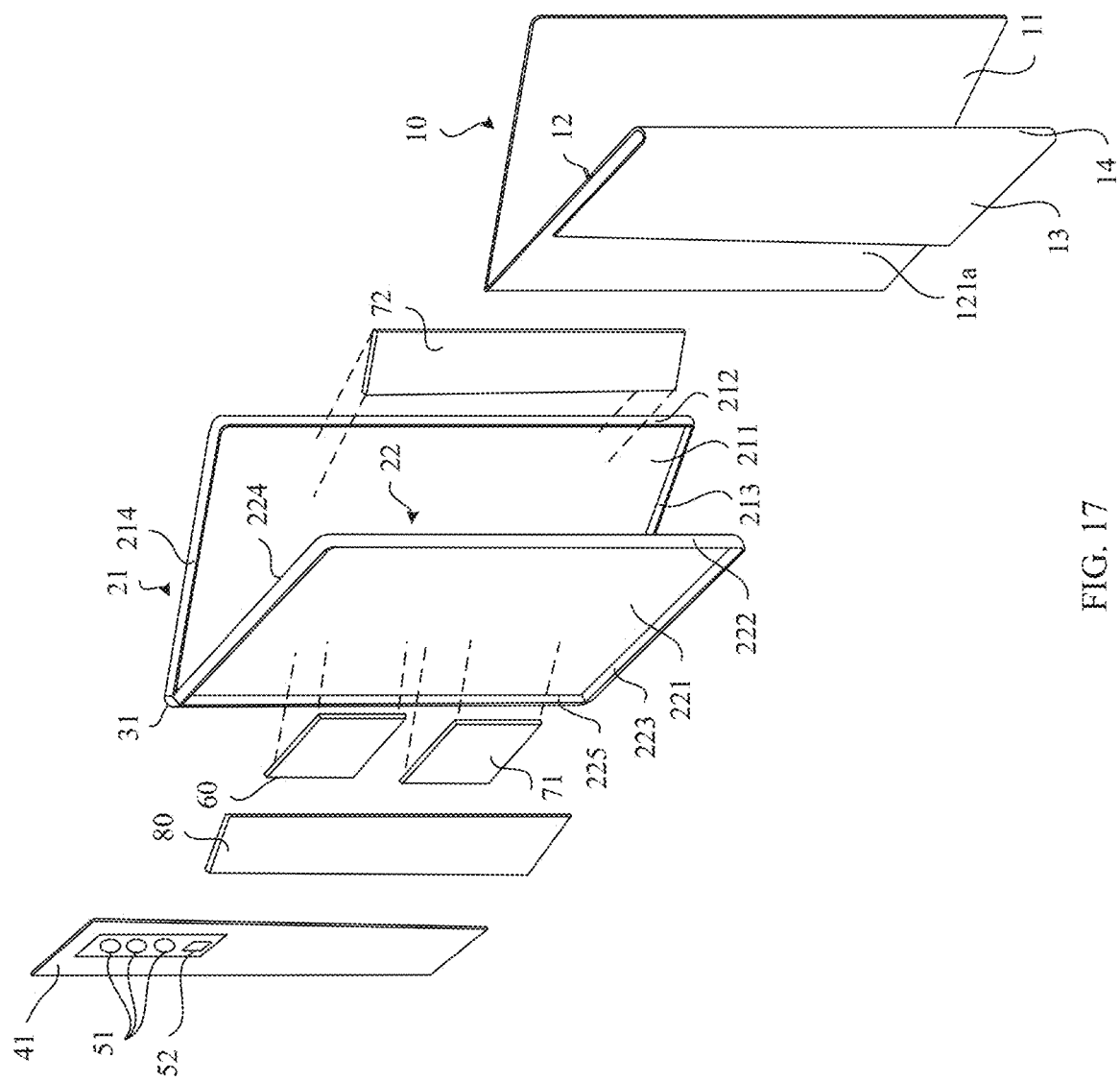
FIG. 17 is an exploded view of a structure of a foldable electronic device according to an embodiment of this application.
Figure 18:
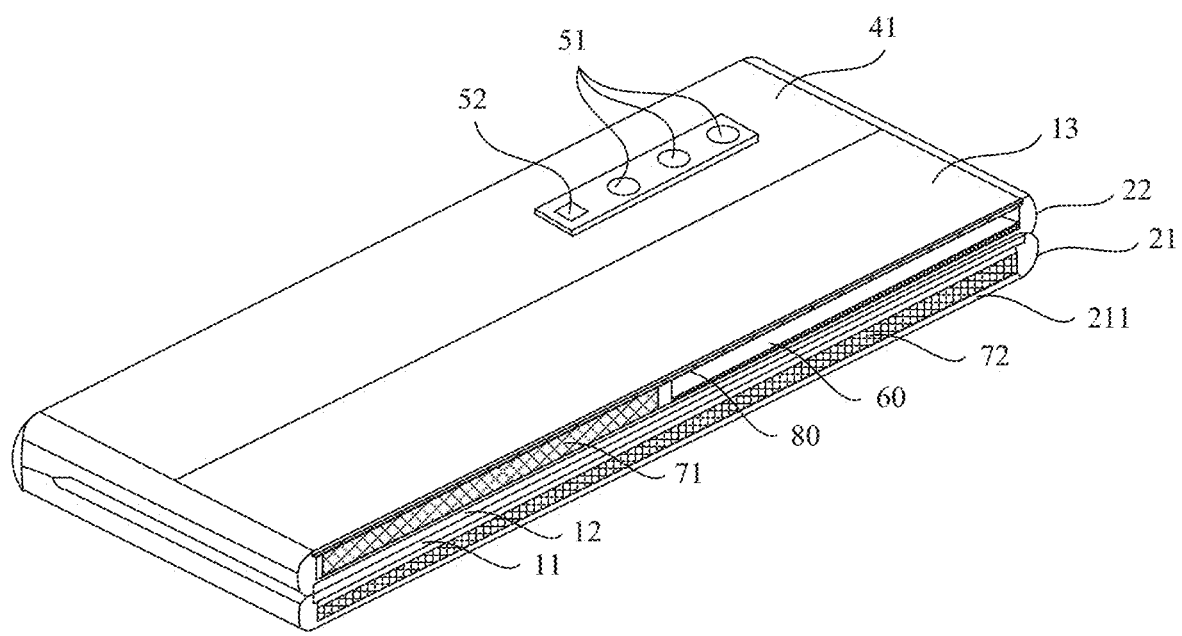
FIG. 18 is a cross-sectional view of a structure of a foldable electronic device in FIG. 17 in a folded state.

In a possible implementation, in this embodiment of this application, as shown in FIG. 17, the first middle plate 211 of the first structural part 21 may replace the second rear cover 42. For example, the first middle plate 211 and each edge that are of the first structural part 21 form a rear cover with a frame, in other words, the first structural part 21 may be a rear cover. In this way, the second rear cover 42 may be omitted, and only the first rear cover 41 is disposed. For example, the rear cover 40 only includes the first rear cover 41, so that the entire rear cover 40 (that is, the first rear cover 41) is located in the first area 121*a* on the rear side of the second display area 12. As shown in FIG. 17, the first middle plate 211 of the first structural part 21 and each edge form a cavity, and the second battery 72 may be located in the cavity. As shown in FIG. 18, the second battery 72 is located between the first display area 11 and the first middle plate 211, and the second battery 72 is located between the first display area 11 and the second middle plate 221.

Scenario 2

Figure 19:
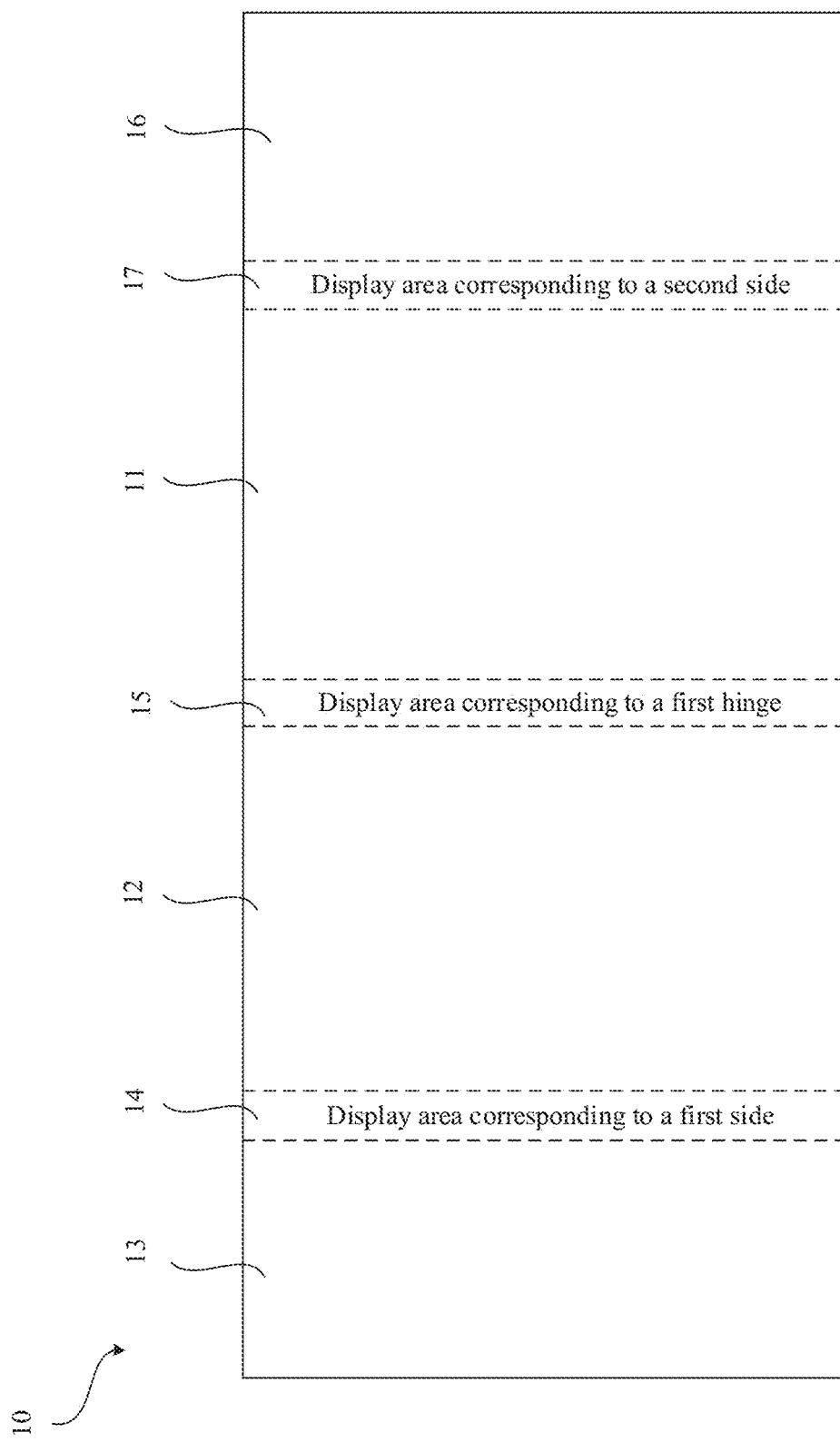
FIG. 19 is a schematic diagram of a structure of an unfolded foldable display screen in a foldable electronic device according to an embodiment of this application.
Figure 20:
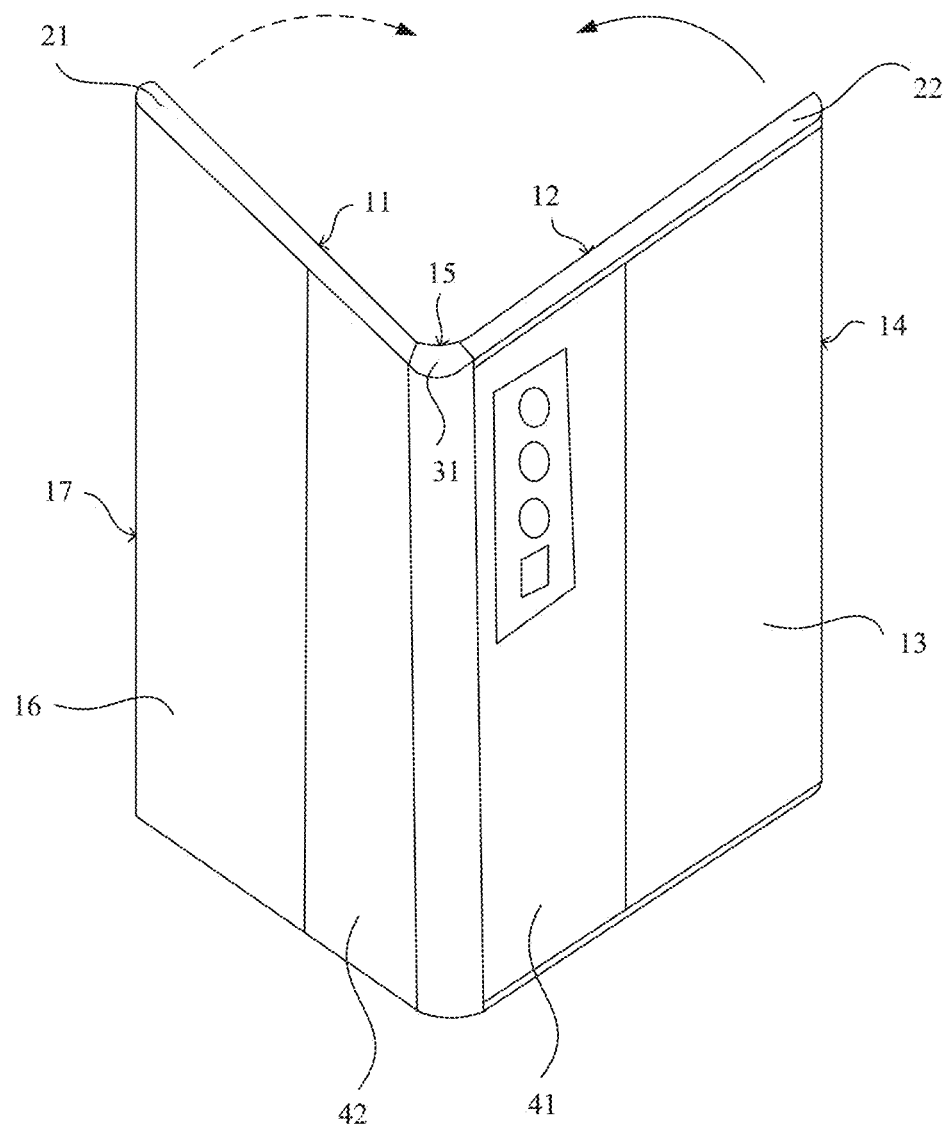
FIG. 20 is a perspective view of a structure of a rear side of a foldable electronic device when the foldable electronic device is folded by a specific angle according to an embodiment of this application.

In this scenario, as shown in FIG. 19, the foldable display screen may further include a sixth display area 16 and a seventh display area 17. The seventh display area 17 is located between the sixth display area 16 and the first display area 11. Refer to FIG. 20. The sixth display area 16 is fixedly disposed on the rear side of the first display area 11. For example, when the foldable mobile phone is in a semi-folded state (as shown in FIG. 20) or an unfolded state (as shown in FIG. 21), the sixth display area 16 keeps facing away from the first display area 11, and a relative position of the sixth display area 16 to the first display area 11 is fixed.

In this embodiment of this application, when the foldable mobile phone is in an unfolded state, the sixth display area 16 and the third display area 13 may be located on a same side and in a same plane. When the foldable mobile phone is in a folded state, the sixth display area 16 and the third display area 13 face away from each other. For example, a display surface of the sixth display area 16 faces away from a display surface of the third display area 13. In this way, after the mobile phone in a folded state is placed, a user can view shortcut information or perform interaction by using either the sixth display area 16 or the third display area 13. This avoids a case in which when the user places the mobile phone in a folded state with the third display area 13 facing away from the user, the user needs to turn over the mobile phone to view the shortcut information in the third display area 13 or perform interaction.

Figure 21:
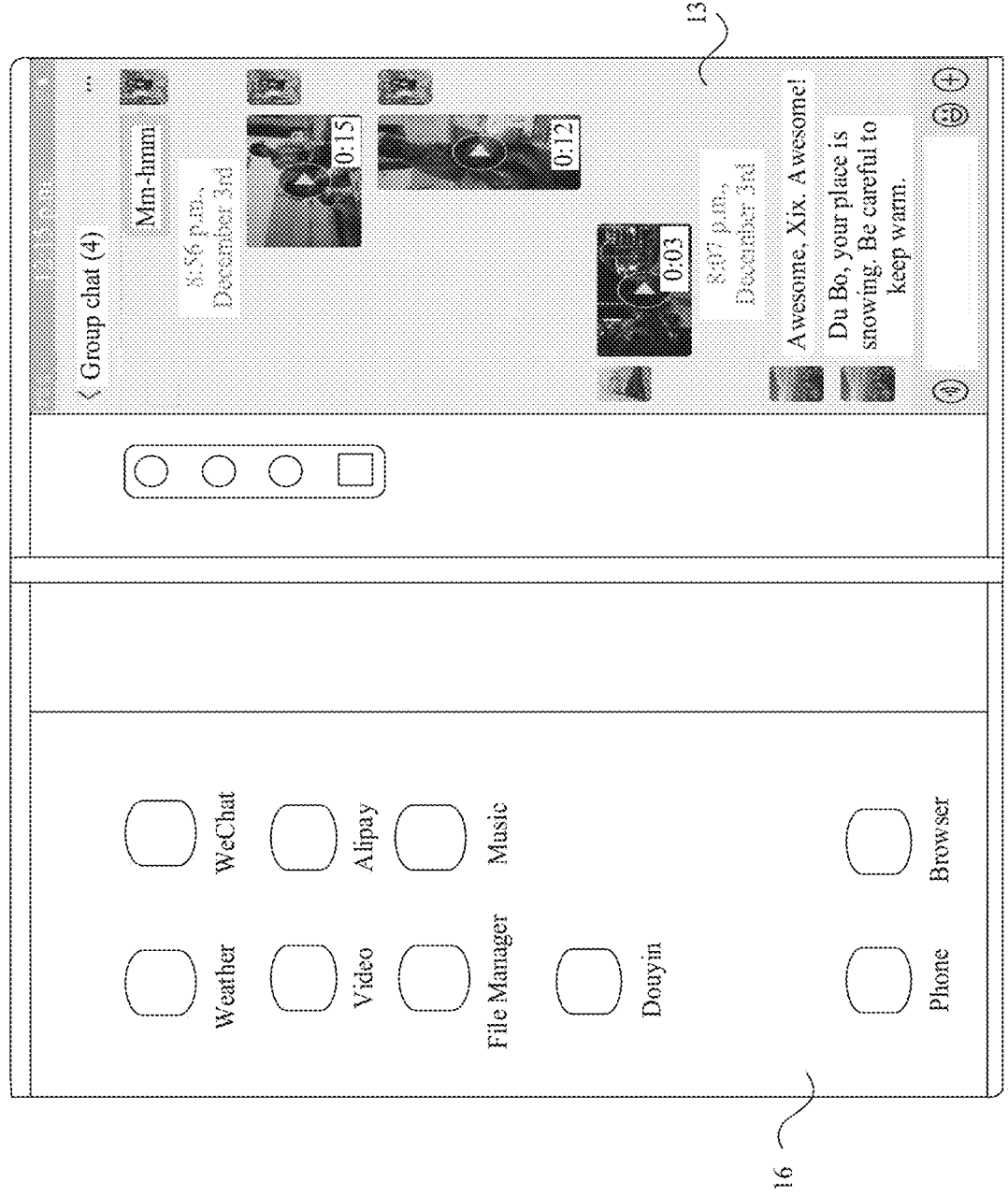
FIG. 21 is a schematic diagram of a structure of a rear side of a foldable electronic device in an unfolded state according to an embodiment of this application.

In this embodiment of this application, when the foldable mobile phone is in an unfolded state, as shown in FIG. 21, the sixth display area 16 and the third display area 13 may display different content. For example, a shortcut icon may be displayed in the sixth display area 16, and WeChat chatting or other interaction may be performed in the third display area 13.

In this embodiment of this application, as shown in FIG. 20, an orthographic projection that is of the sixth display area 16 and that is on the rear side of the first display area 11 may partially cover the rear side of the first display area 11. For example, the rear side of the first display area 11 may include two areas. The sixth display area 16 is located in one of the two areas, and the second rear cover is located in the other area. A display surface of the sixth display area 16 is aligned with an outer surface of the second rear cover, to ensure that no mismatch exists between the sixth display area 16 and the second rear cover, and the sixth display area 16 and the second rear cover form a smooth outer surface.

Figure 22:
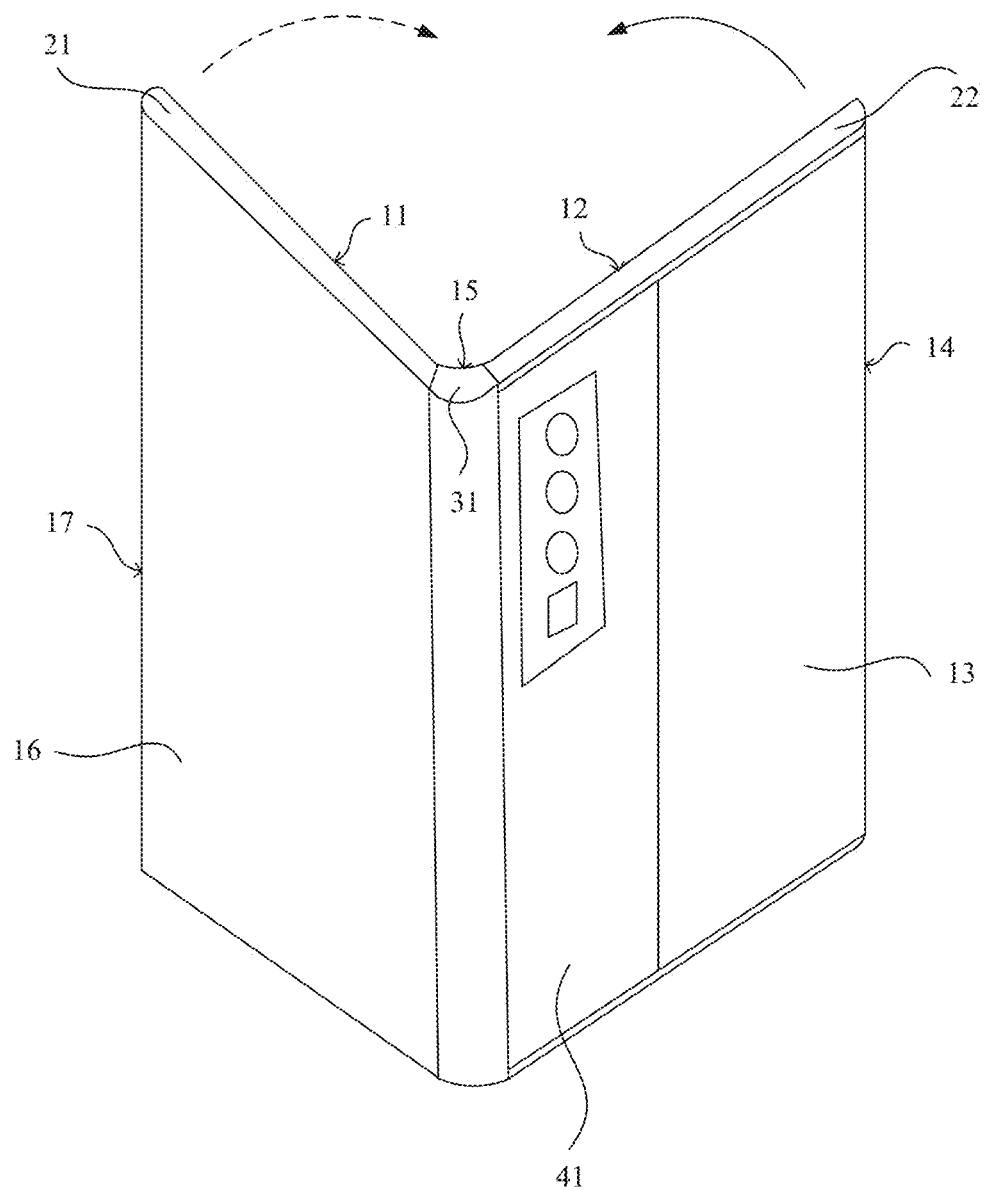
FIG. 22 is a perspective view of a structure of a rear side of a foldable electronic device when the foldable electronic device is folded by a specific angle according to an embodiment of this application.

Alternatively, as shown in FIG. 22, an orthographic projection that is of the sixth display area 16 and that is on the rear side of the first display area 11 may completely cover the rear side of the first display area 11. For example, a display area of the sixth display area 16 may be the same as the display surface of the first display area 11. In this way, when a user uses the foldable mobile phone, and the mobile phone is in a folded state, a display surface of the sixth display area 16 is larger. Therefore, the sixth display area 16 can satisfy most interactions and functions. When the user needs to watch a video or play a game on a large screen, the user may unfold the foldable mobile phone.

In this embodiment of this application, a second side edge of the foldable electronic device may be the second side edge 212 of the first structural part 21. Therefore, the seventh display area 17 may be located on the second side edge 212 of the first structural part 21 (refer to FIG. 17). In this way, the seventh display area 17 and the fourth display area 14 are respectively located on two sides of the foldable mobile phone, so that both the two sides of the foldable mobile phone can perform display, no black edge exists on the first side edge 222 in the first display area 11 and on the second side edge 212 in the second display area 12, and a screen-to-body ratio is larger when the mobile phone is in an unfolded state. In addition, no black edge exists on the first side edge 222 in the third display area 13 and on the second side edge 212 in the sixth display area 16, so that display surfaces of the third display area 13 and the sixth display area 16 are larger.

Scenario 3

Figure 23:
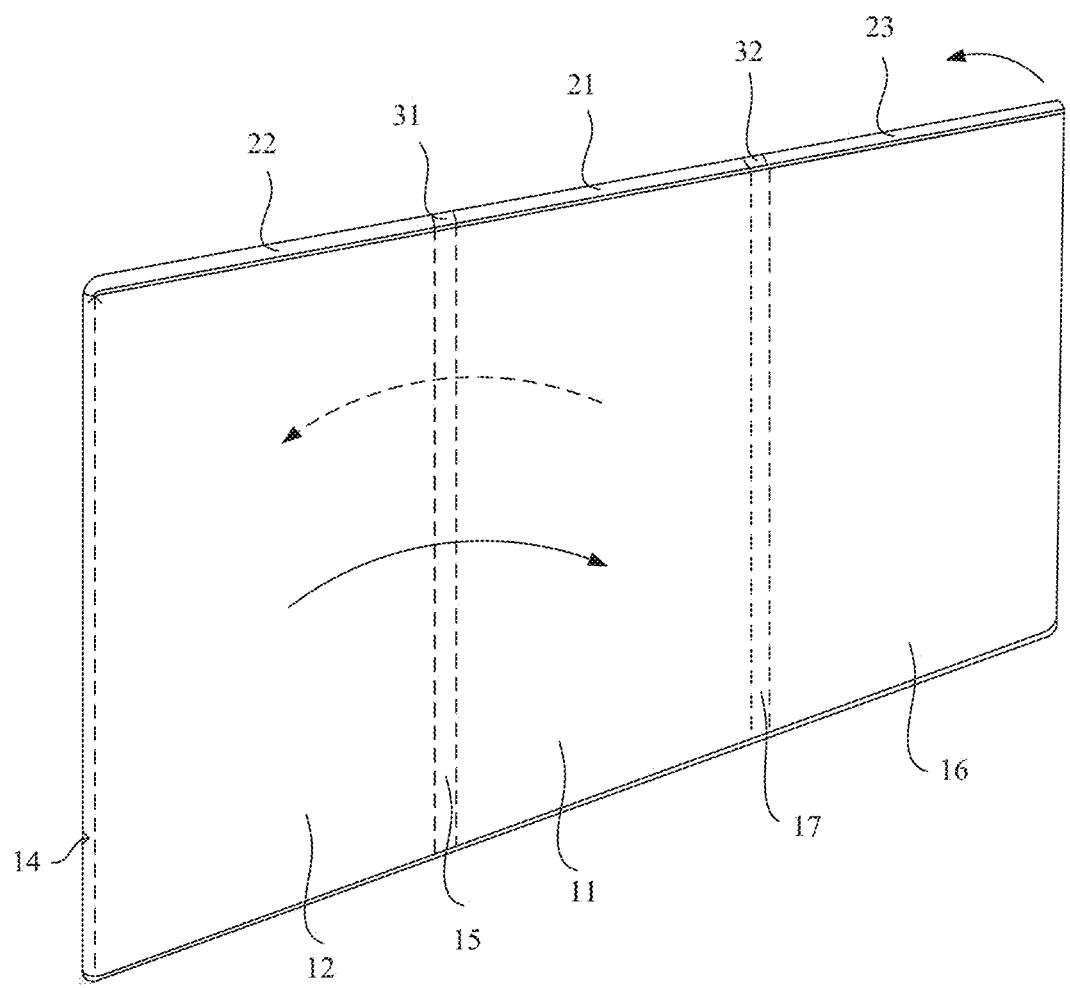
FIG. 23 is a perspective view of a structure of a foldable electronic device in an unfolded state according to an embodiment of this application.
Figure 24:
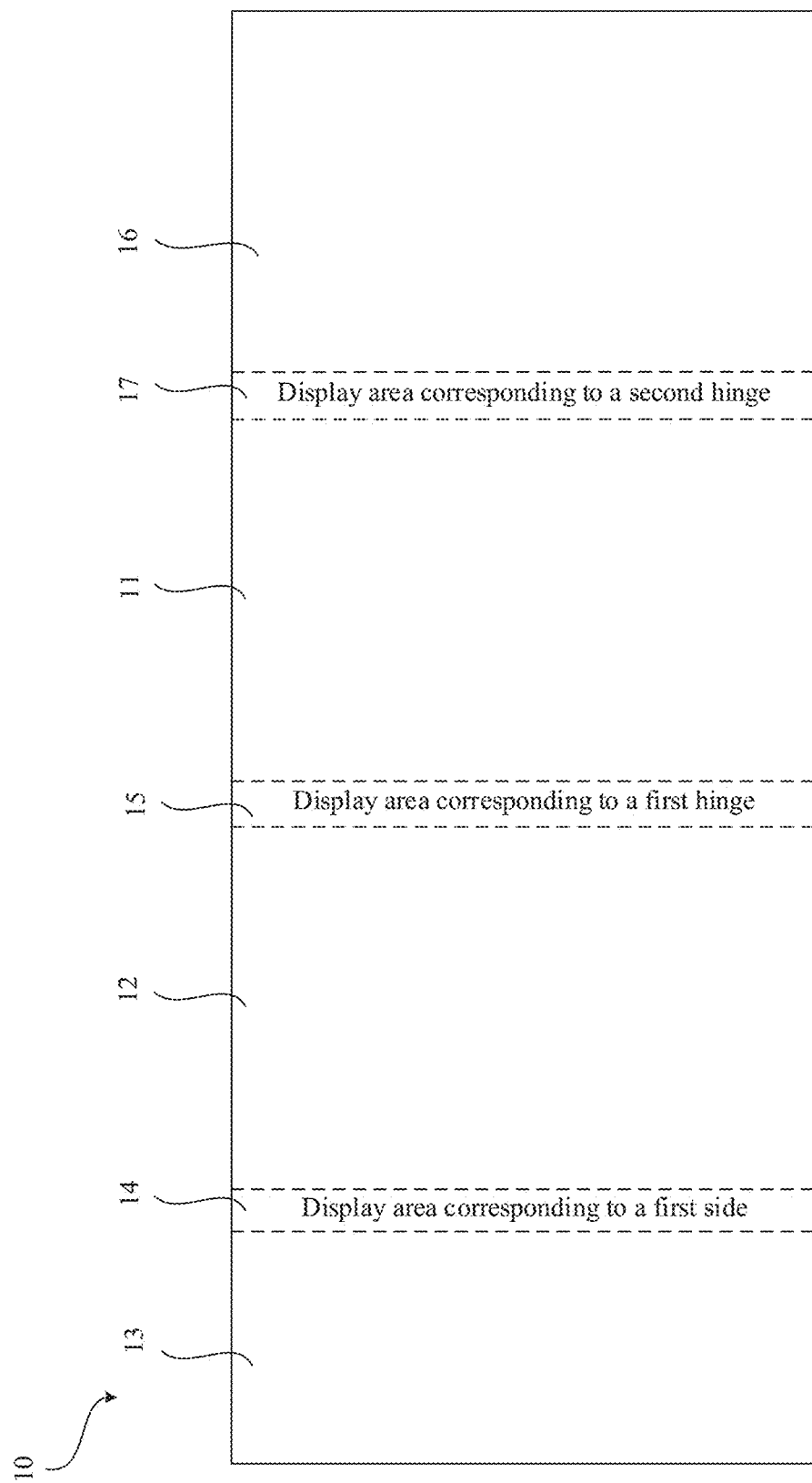
FIG. 24 is a schematic diagram of a structure of an unfolded foldable display screen in a foldable electronic device according to an embodiment of this application.

In the foregoing scenario 2, the sixth display area 16 is fixedly disposed. However, in this scenario, a relative position of the sixth display area 16 to the first display area 11 may change. For example, the sixth display area 16 may be disposed rotationally relative to the first display area 11. As shown in FIG. 23, the foldable mobile phone may further include a third structural part 23 and a second hinge 32. The third structural part 23 is rotationally connected to the first structural part 21 by using the second hinge 32, and the third structural part 23 supports the sixth display area 16. As shown in FIG. 23 and FIG. 24, the seventh display area 17 is located at the second hinge 32.

Figure 25:
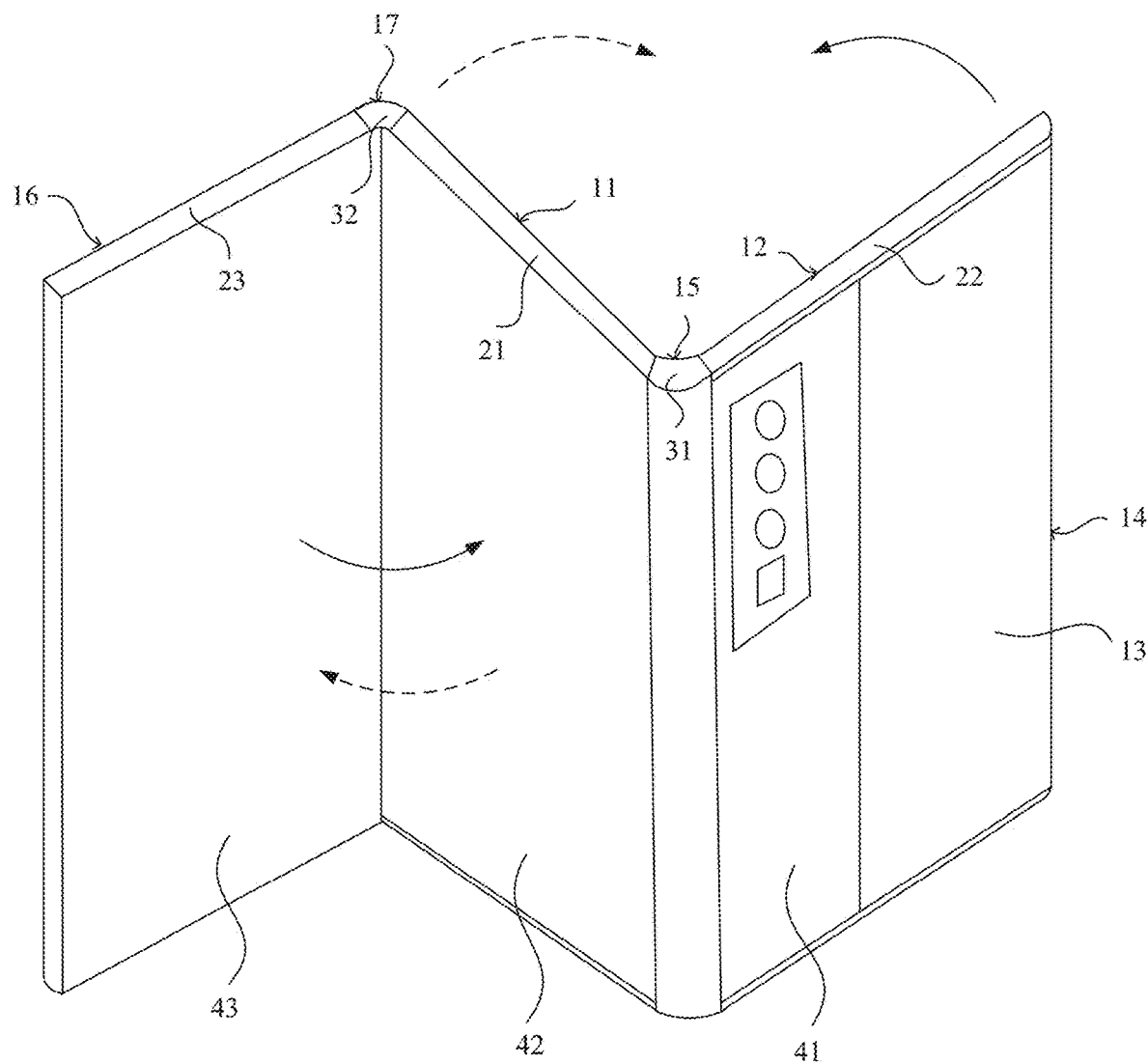
FIG. 25 is a perspective view of a structure of a rear side of a foldable electronic device when the foldable electronic device is folded by a specific angle according to an embodiment of this application.

It should be noted that, when the foldable mobile phone includes the first hinge 31 and the second hinge 32, rotation directions of the first display area 11 and the second display area 12 may be different from rotation directions of the sixth display area 16 and the first display area 11. For example, as shown in FIG. 25, the first display area 11 and the second display area 12 may rotate between 0° and 180°, and the sixth display area 16 and the first display area 11 may rotate between 180° and 360°. In this embodiment of this application, the foldable mobile phone being in an unfolded state is a state shown in FIG. 23 in which the first display area 11 and the second display area 12 are at 180° and the first display area 11 and the sixth display area 16 are at 180°. The foldable mobile phone being in a folded state is a state in which the first display area 11 and the second display area 12 are at 0° and the first display area 11 and the sixth display area 16 are at 360°.

In this embodiment of this application, as shown in FIG. 25, the rear cover 40 may further include a third rear cover 43. The third rear cover 43 and the sixth display area 16 are respectively located on two sides of the third structural part 23. The third rear cover 43 is located in an entire area on a rear side of the sixth display area 16, and the second rear cover 42 is located in the entire area on the rear side of the first display area 11. When the first structural part 21 and the third structural part 23 are in a folded state, the third rear cover 43 faces the second rear cover 42. In this embodiment of this application, the third rear cover 43 and the second rear cover 42 may be disposed independently of each other. Alternatively, the third rear cover 43 and the second rear cover 42 may be an integrated structure. The integrated structure may be a bendable plate, for example, may be a flexible plate, a part of the flexible plate is used as the third rear cover 43, and another part of the flexible plate is used as the second rear cover 42.

When the foldable mobile phone is in an unfolded state, as shown in FIG. 23, the sixth display area 16 and the display surface of the first display area 11 are in a same plane. When the first structural part 21 and the third structural part 23 that are of the foldable mobile phone are folded together. For example, as shown in FIG. 26, the sixth display area 16 faces away from the first display area 11, that is, when the folded mobile phone is in a folded state, the display surface of the sixth display area 16 faces away from the display surface of the first display area 11.

Figure 26:
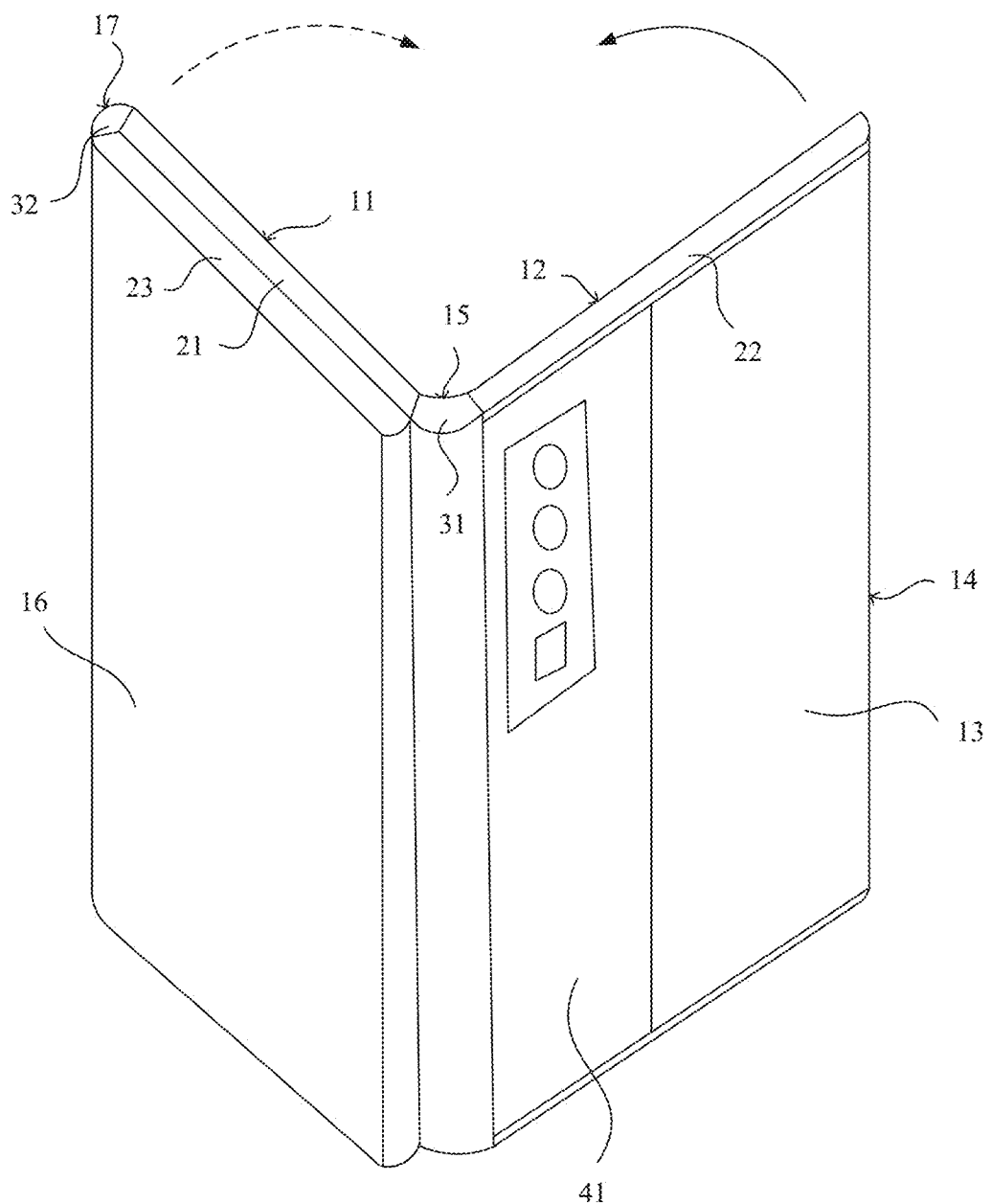
FIG. 26 is a perspective view of a structure obtained when a sixth display area of a foldable electronic device is folded to a rear side of a first display area according to an embodiment of this application.

In this embodiment, as shown in FIG. 26, when the sixth display area 16 faces away from the first display area 11, the sixth display area 16 completely covers the second rear cover 42. In this way, when the three structural parts of the foldable mobile phone are folded together, a side on which the sixth display area 16 is located is a stable structure and has no step from the second rear cover 42, thereby ensuring aesthetic appearance of the foldable electronic device.

In descriptions of embodiments of this application, it should be noted that, unless otherwise clearly specified and limited, the terms "installation", "connection to", and "connection" should be understood in a broad sense. For example, the connection may be a fixed connection, may be an indirect connection by using an intermediate medium, or may be an internal connection between two elements or an interaction relationship between two elements. For a person of ordinary skill in the art, specific meanings of the foregoing terms in embodiments of this application may be understood according to a specific situation.

In the specification, claims, and accompanying drawings of embodiments of this application, the terms "first", "second", "third", "fourth", and so on (if any) are intended to distinguish between similar objects but do not necessarily indicate a specific order or sequence.

Finally, it should be noted that the foregoing embodiments are merely intended for describing the technical solutions of embodiments of this application other than limiting embodiments of this application. Although embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A foldable electronic device comprising:
   a foldable display screen comprising:
   a first display area;
   a second display area comprising a first rear side, wherein the first rear side comprises:
   a first area; and
   a second area,
   wherein the first display area faces the second display area when the foldable electronic device is in a folded state;
   a third display area located in the second area and facing away from the second display area;
   a fourth display area located between the second display area and the third display area;
   a fifth display area located between the first and second display areas; and
   a sixth display area on a second rear side of the first display area, wherein the first display area faces away from the sixth display area and the second display area faces away from the third display area when the foldable electronic device is in a folded state and in an unfolded state;
   at least one camera located in the first area;
   a button disposed in the fourth display area;
   one hinge;
   a first structural part supporting the first display area; and
   a second structural part supporting the second display area, wherein the first structural part and the second structural part are configured to rotate relative to the one hinge to make the first display area face the second display area when the foldable electronic device is in the folded state, and wherein the electronic device includes only the one hinge.

2. The foldable electronic device of claim 1, further comprising a first side edge, wherein the fourth display area is further located in the first side edge.

3. The foldable electronic device of claim 1, wherein the button comprises a virtual button.

4. The foldable electronic device of claim 3, wherein the virtual button is configured as a volume button.

5. The foldable electronic device of claim 3, wherein the virtual button comprises at least one of:
   a dial button;
   a camera button; or
   a payment button.

6. The foldable electronic device of claim 1, further comprising an indicator disposed in the fourth display area.

7. The foldable electronic device of claim 1, wherein the fourth display area is configured to display indication information indicating a battery level of the foldable electronic device.

8. The foldable electronic device of claim 1, further comprising a distance sensor or an ambient optical sensor disposed in the first area.

9. The foldable electronic device of claim 1, wherein the fifth display area is located on the first hinge.

10. The foldable electronic device of claim 1, wherein the sixth display area is fixedly disposed on the second rear side, and wherein the foldable display screen further comprises:

a seventh display area located between the sixth display area and the first display area.

11. The foldable electronic device of claim 10, further comprising:
a first side edge; and
a second side edge,
wherein the seventh display area is located on the second side edge, and
wherein the first side edge is configured to face the second side edge when the foldable electronic device is in a folded state.

12. The foldable electronic device of claim 11, wherein an orthographic projection area that is on the second rear side and that is of the sixth display area is configured to partially or completely cover the second rear side.

13. The foldable electronic device of claim 10, wherein the one hinge is located between the sixth display area and the at least one camera located in the first area.

14. The foldable electronic device of claim 1, further comprising a rear cover, wherein a part of an area of the rear cover is located in the first area, and wherein an outer surface of the rear cover that is located in the first area is configured to align with a display surface of the third display area.

15. The foldable electronic device of claim 14, wherein the at least one camera comprises an end face that faces an object side and is configured to protrude from the outer surface.

16. The foldable electronic device of claim 1, wherein the foldable electronic device is a foldable mobile terminal.

17. The foldable electronic device of claim 1, wherein the foldable display screen comprises an organic light-emitting diode (OLED) display screen.

18. The foldable electronic device of claim 1, wherein the sixth display area is larger than the third display area.

19. The foldable electronic device of claim 1, wherein the one hinge is located between the sixth display area and the at least one camera located in the first area.

20. The foldable electronic device of claim 1, wherein area when the foldable electronic device is in a folded state the sixth display area and the third display area display the same information.

* * * * *